(12) United States Patent
Vercaemer

(10) Patent No.: US 7,270,177 B2
(45) Date of Patent: Sep. 18, 2007

(54) INSTRUMENTED PACKER

(75) Inventor: Claude Vercaemer, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/332,501

(22) Filed: Jan. 13, 2006

(65) Prior Publication Data

US 2006/0175056 A1    Aug. 10, 2006

Related U.S. Application Data

(62) Division of application No. 10/374,261, filed on Feb. 26, 2003, now Pat. No. 7,040,402.

(51) Int. Cl.
*E21B 33/13* (2006.01)
*E21B 47/10* (2006.01)
(52) U.S. Cl. ..................... 166/66; 166/177.4
(58) Field of Classification Search ............ 166/66, 166/252.6, 250.12, 250.1, 254.1, 254.2, 177.4
See application file for complete search history.

(56) References Cited

U.S. PATENT DOCUMENTS

| | | | | |
|---|---|---|---|---|
| 4,832,121 A | * | 5/1989 | Anderson | 166/250.09 |
| 5,044,436 A | * | 9/1991 | Magnani | 166/247 |
| 5,442,173 A | * | 8/1995 | Wraight | 250/260 |
| 5,503,225 A | * | 4/1996 | Withers | 166/250.1 |
| 5,509,474 A | * | 4/1996 | Cooke, Jr. | 166/64 |
| 5,635,712 A | * | 6/1997 | Scott et al. | 250/260 |
| 5,642,051 A | * | 6/1997 | Babour et al. | 324/357 |
| 6,847,034 B2 | * | 1/2005 | Shah et al. | 250/269.1 |
| 2004/0206495 A1 | * | 10/2004 | Lehman et al. | 166/250.1 |

* cited by examiner

*Primary Examiner*—Hoang Dang
(74) *Attorney, Agent, or Firm*—Fred G. Pruner; Dona C. Edwards; Bryan P. Galloway

(57) ABSTRACT

A technique that is usable with a subterranean well includes communicating a fluid into a region of the well and monitoring a level of the fluid communicated via a downhole sensor. The communication is controlled in response to the monitoring.

14 Claims, 18 Drawing Sheets

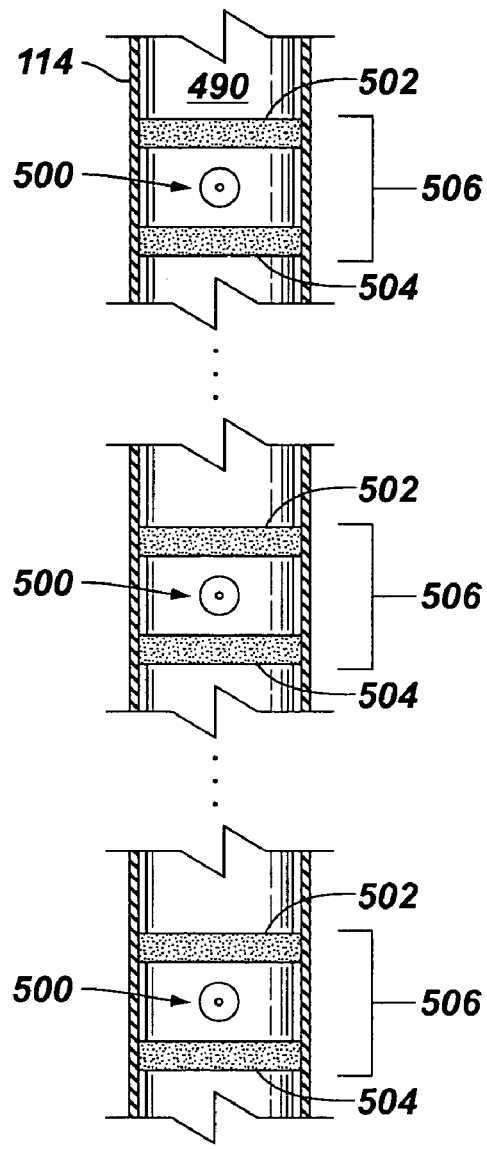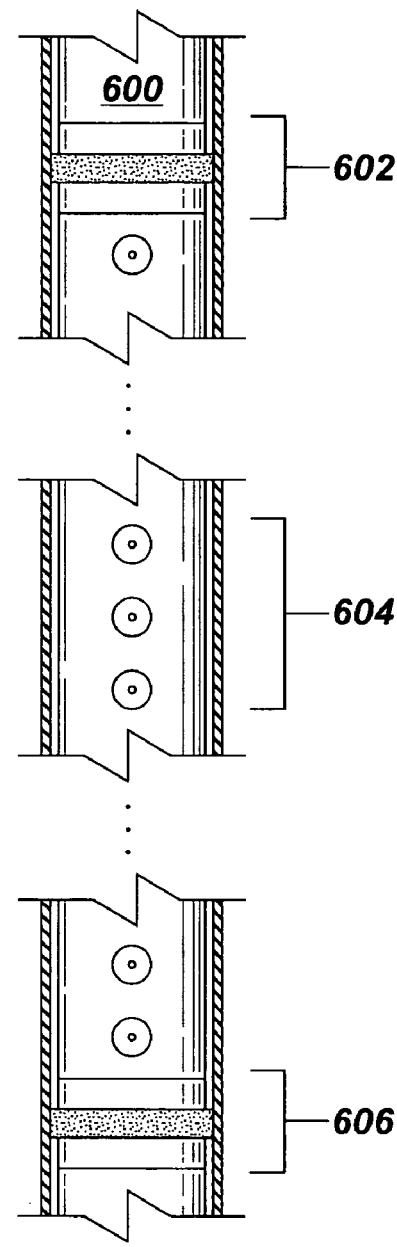

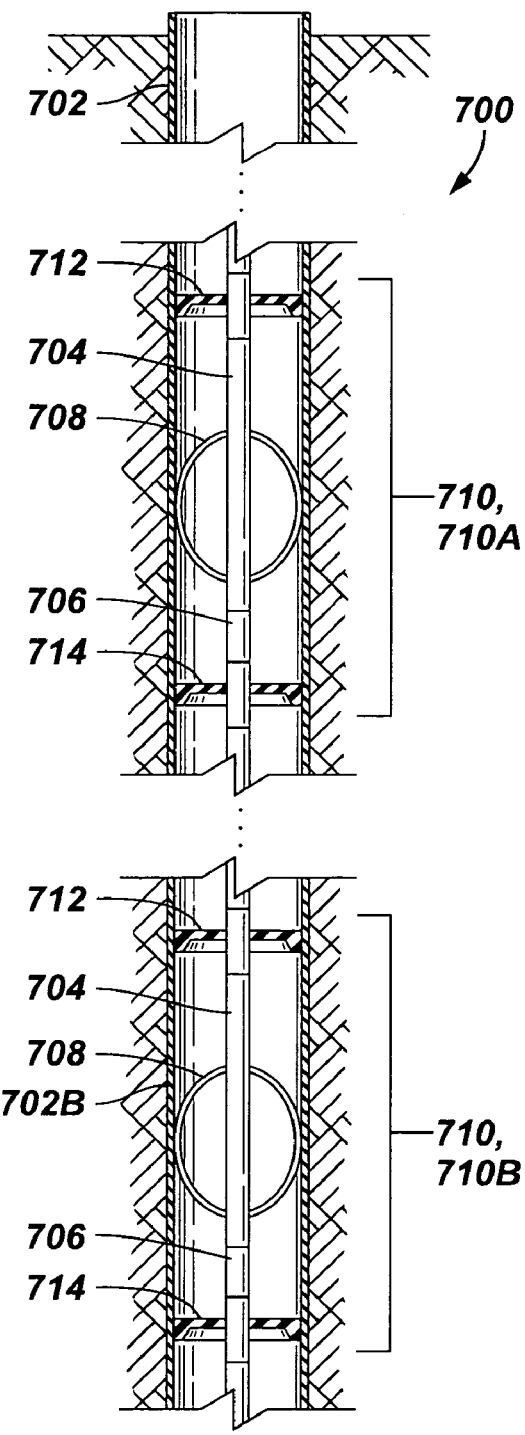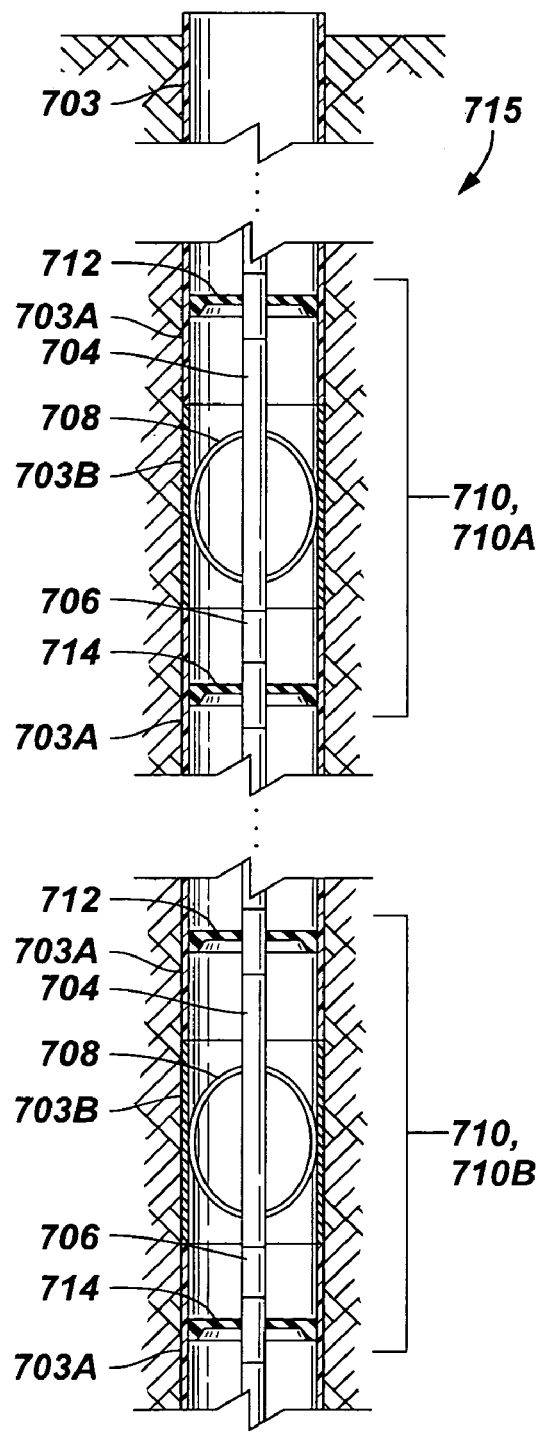

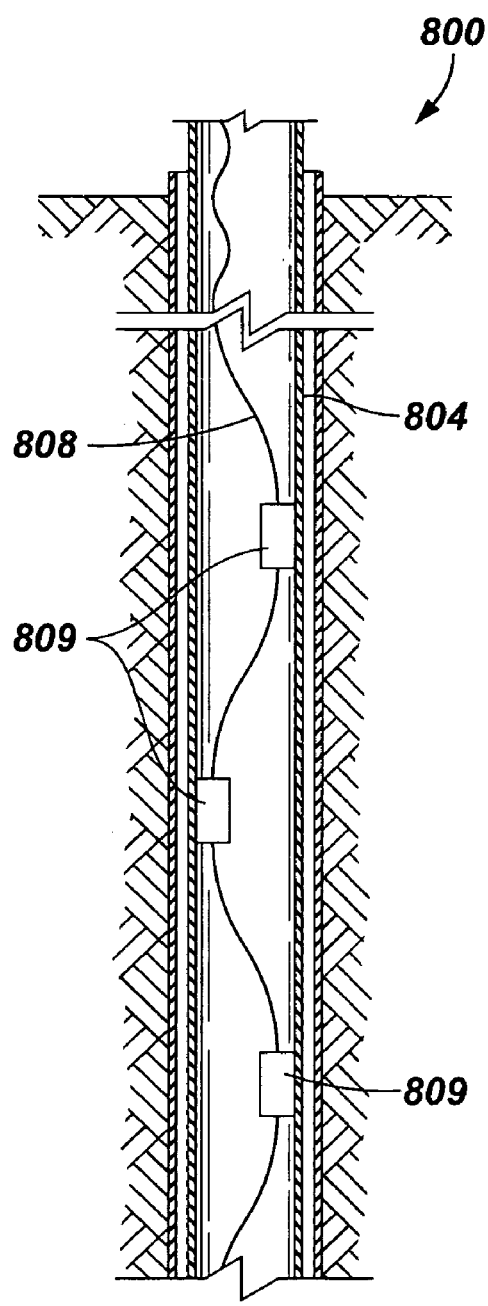
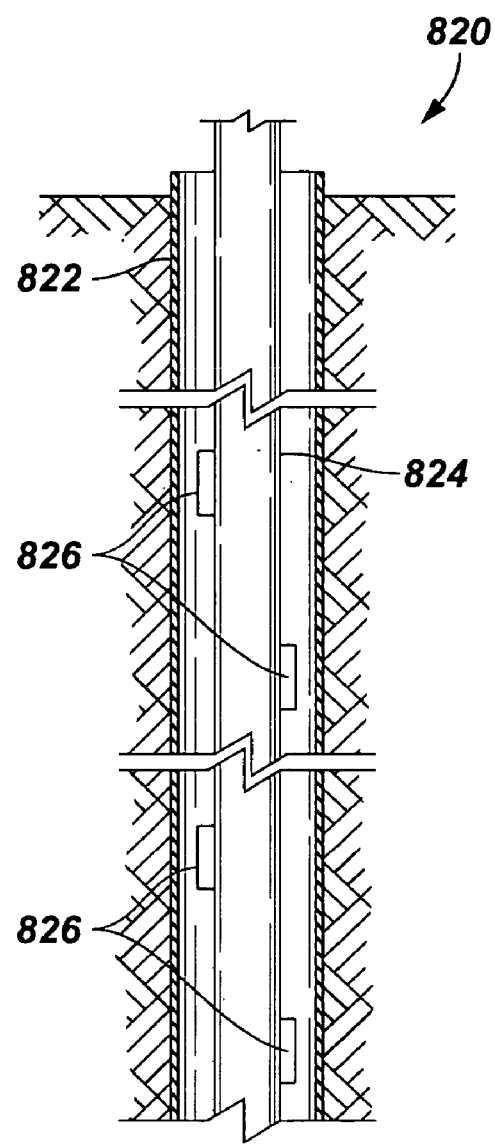

INSTRUMENTED PACKER

CROSS-REFERENCE TO RELATED APPLICATIONS

This is a division of application Ser. No. 10/374,261 filed Feb. 26, 2003 U.S. Pat. No. 7,040,402, which issued on May 9, 2006, and is hereby incorporated by reference in its entirety.

STATEMENT REGARDING FEDERALLY-SPONSORED RESEARCH

Not applicable.

REFERENCE TO A SEQUENCE LISTING

Not applicable.

BACKGROUND

The invention generally relates to an instrumented packer.

An oilfield well may have several production zones. These zones are established by one or more wellbores (of the well) that extend through one or more subterranean formations. Different zones may need to be treated over the lifetime of the well.

For example, a well treatment may be needed to selectively block or seal off production from a particular zone. In this manner, production from each zone is not always the same, as the compositions of the fluids produced by the zones typically vary. For example, some of the zones may produce an unacceptable level of water, and thus, it may be desirable to seal off these zones from the well. As another example, some of the zones may produce unacceptable levels of contaminants, and thus, it may be desirable to also block the communication of fluids from these zones. The quality of production from a particular zone may vary over the course of the well's lifetime. For example, over time, a zone may transition from producing well fluid of an acceptable quality to producing too much water or producing well fluid having an unacceptably high level of contaminants.

Thus, at some point, either before the initial installation of production equipment or at a later time, corrective action may have to be performed to seal off a particular zone in a well. One type of corrective action involves a technique that is referred to in the industry as a "squeeze job." In a squeeze job, any production tubing that is present in the well is first removed from the affected zone. Subsequently, the zone is isolated using temporary packers. This isolation involves sealing off the area inside the casing string or inside the wellbore, depending on whether the well is cased. A mixture called a cement slurry is then pumped down through a tube into the isolated zone and hardens into a cement to seal off the zone.

In the squeeze job, the cement slurry may be directed into perforation tunnels of the zone. In other applications, the cement may fill gravel packing of the zone. In this manner, the gravel packing is used in some wells to filter sand in an unconsolidated formation while allowing the oil to flow through. However, the corresponding production zone may be invaded by brine and thus, it may become necessary to plug the gravel packing by cementing through the gravel.

Well treatments also exist to enhance the production from a particular zone. For example, it may be desirable to introduce acid in a zone, in an operation called "acidizing." The introduced acid increases the productivity of the zone. However, when acidizing, it may be necessary to isolate the zone in which acid is introduced, because if the acid reaches a particular water-producing zone, water production from that zone may be undesirably enhanced. Thus, for the acidizing operation, it is also desirable to isolate the zone in which the operation is being performed.

In all of the above-described operations, an estimation typically is made of the volume of fluid (i.e., the cement slurry, acidizing fluid, or other chemical) that is needed to complete the well treatment operation. For example, in a cement squeeze operation, an estimation of the volume of cement slurry needed to isolate a particular zone is made. However, it is often difficult to ascertain the volume capacity of the zone into which the fluid is being introduced, and this difficulty may present challenges in effectively performing the operation. For example, if not enough cement slurry is used in a cement squeeze operation, then the targeted zone may not be properly isolated. However, if too much cement slurry is communicated into the well, production from an adjacent zone may be advertently blocked. As another example, if too much acidizing fluid is introduced into the targeted zone, the acidizing fluid may migrate into an adjacent water producing zone and enhance the water production from that zone.

Thus, there is a continuing need for an arrangement and/or technique to address one or more of the problems that are stated above as well as possibly address other problems not stated above.

SUMMARY

In an embodiment of the invention, a technique that is usable with a subterranean well includes communicating a fluid into a region of the well and monitoring a level of the fluid communicated via a downhole sensor. The communication is controlled in response to the monitoring.

Advantages and other features will become apparent from the following description, drawing and claims.

BRIEF DESCRIPTION OF THE DRAWING

FIGS. 8, 19, 20, 22 and 23 are schematic diagrams of subterranean wells according to different embodiments of the invention.

FIGS. 14, 15, 16, 17 and 18 are schematic diagrams of different strings according to different embodiments of the invention.

DETAILED DESCRIPTION

Figure 1:
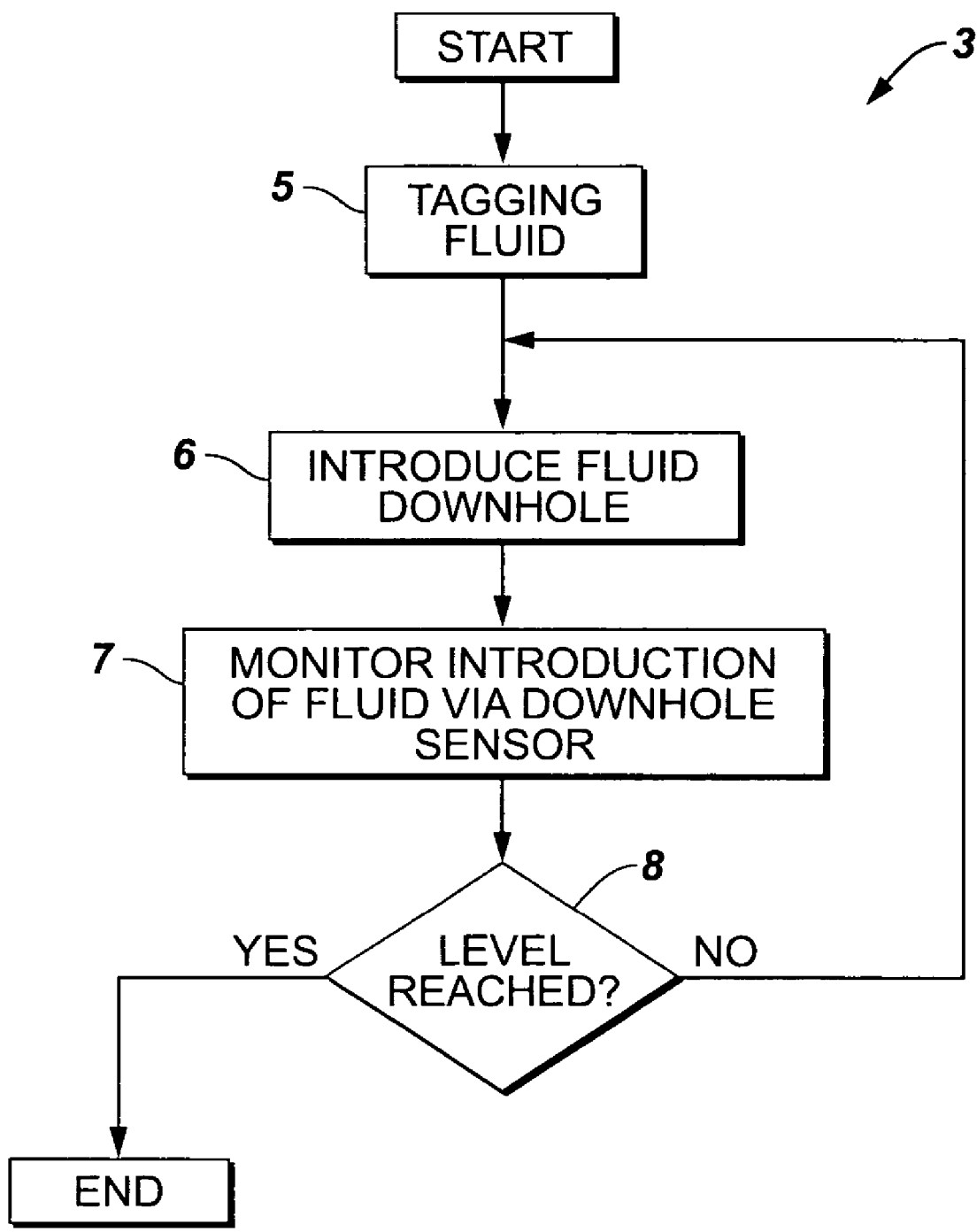
FIG. 1 is a flow diagram of a technique to monitor the communication of fluid into a zone according to an embodiment of the invention.

Referring to FIG. 1, an embodiment 3 of a technique in accordance with the invention is used in connection with a well treatment for purposes of monitoring the amount of fluid that is communicated into a particular zone of the well. For example, this fluid may be a cement slurry that is used for purposes of performing a cement squeeze operation and/or used for purposes of plugging off a particular water producing zone of the well. As another example, this fluid may be a chemical used to plug off a particular water producing formation of the well. Alternatively, the fluid may be an acid used for purposes of enhancing production from a particular zone of the well. Regardless of the composition of the fluid, the techniques that are described herein, such as the technique 3, permit precise monitoring of the level of fluid that is introduced into a particular zone.

More specifically, referring to FIG. 1, the technique 3 includes tagging (block 5) a well treatment fluid that is to be introduced into the well. This tagging includes introducing certain tagging agents (into the fluid) that have characteristics that permit detection of the tagging agents and fluid downhole. For example, the tagging agents that are introduced into the fluid may be radioactive particulates, salt or ferromagnetic particulates, as just a few examples. These tagging agents have characteristics that are detectable by one or more downhole sensors. Thus, by detecting these agents downhole, the presence and level of the tagged fluid may be precisely monitored and controlled so that the appropriate amount of fluid is introduced into the well.

Pursuant to the technique 3, after the fluid is tagged, the tagged fluid is communicated downhole, as depicted in block 6. More specifically, the fluid is introduced into an isolated zone, in some embodiments of the invention. While the fluid is being communicated, the introduction of the fluid is monitored via a downhole sensor, as depicted in block 7. As described below, in some embodiments of the invention, this sensor is located inside the isolated zone into which the fluid is being introduced. Also, during this communication, the level of the fluid is determined (diamond 8), and if a particular predetermined fluid level has not been reached, the technique returns to block 6 to continue the communication and monitoring of the fluid.

Figure 2:
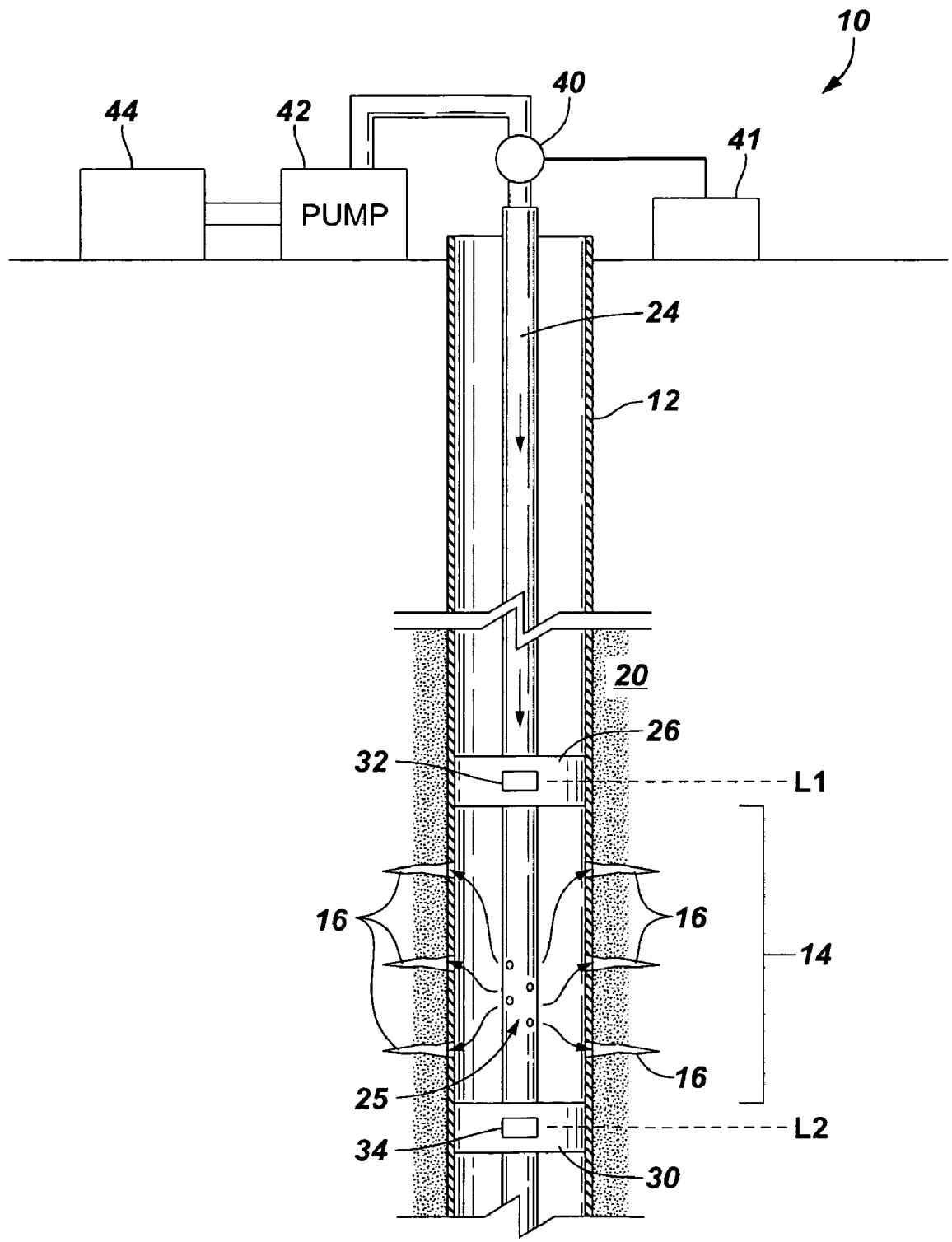
FIGS. 2 and 4 are schematic diagrams of systems to communicate a cement slurry into a zone according to different embodiments of the invention.

FIG. 2 depicts a more specific embodiment of the invention in which a cement slurry is introduced into a well for purposes of performing a cement squeeze operation. More particularly, FIG. 2 depicts a system 10 that includes a casing string 12 that extends into a wellbore that, in turn, extends through one or more subterranean formations. Although only one wellbore is depicted in FIG. 2, it is understood that the well may include additional wellbores.

FIG. 2 also depicts a particular production zone 14, a zone that includes perforation tunnels 16 that extend into the surrounding formation. These perforation tunnels 16 are formed by perforation jets (created by detonated shaped charges) that pierce the casing string 12. Although one production zone 14 is depicted in FIG. 2, it is understood that the well may have multiple zones.

It is possible that a particular problem may occur with the production zone 14, thereby requiring corrective action. For example, for the production zone 14, it is possible that an undesirable level of water may be produced from the zone 14, an undesirable level of contaminants may be produced from the zone 14, or other problems may exist with the zone 14. Thus, it may be desirable to isolate the zone 14 from the remainder of the well 10. To perform this isolation, production equipment is removed from the well 10 so that a cementing string 24 may be run downhole inside the central passageway of a casing string 12. The cementing string 24 serves as a conduit to communicate for purposes of a cement slurry into the zone 14.

As depicted in FIG. 2, in some embodiments of the invention, the string 24 includes an upper packer 26 and a lower packer 30. These upper 26 and lower 30 packers straddle the affected zone 14 to effectively isolate the zone during the cementing operation. In this manner, in this operation, the string 24 is initially lowered in place until the zone 14 is located between the upper 26 and lower 30 packers. When in the appropriate position, the upper 26 and lower 30 packers are set. As examples, the packers may be hydraulically or mechanically set packers.

It is noted that the isolation provided by the packers 26 and 30 is not a complete isolation. For example, in the arrangement depicted in FIG. 2, the introduced cement slurry may propagate outside of the casing string 12 and beyond the packers 26 and 30 through the gravel 20. However, the packers 26 and 30 include devices to monitor the level of the cement slurry to control the cementing operation, as described further below.

When the upper 26 and lower 30 packers are set, the elastomer elements of the packers extend between the exterior of the casing string 24 and the interior surface of the wall of the casing string 12 for purposes of creating an isolated zone between the upper 26 and lower 30 packers. Once this isolated zone has been created, a cement slurry may then be introduced through the central passageway of the string 24. In this manner, the cement slurry flows from the surface of the well through the central passageway of the string 24 and into the isolated zone via radial ports 25 of the string 24. As the cement slurry enters the isolated region, cement slurry flows into the perforation tunnels 16.

The well that is depicted in FIG. 2 utilizes gravel packing, which means that gravel 20 lines the exterior of the casing string 12 between the formation and the casing string 12 and thus, surrounds the isolated region. It is possible that the cementing operation is being used to effectively plug the gravel packing 20, and thus, in this application, the cement slurry enters the gravel packing between the upper 26 and lower 30 packers. The cement slurry enters the perforation tunnels 16 and the annular region outside of the casing string. It is noted that conventionally, the amount of cement slurry that is needed to isolate the zone is estimated, thereby leading to possibly the introduction of not enough cement slurry (thereby ineffectively isolating the zone 14) or the introduction of too much cement slurry (thereby undesirably extending the isolation into another zone).

However, unlike conventional systems, the string 24 includes downhole devices to monitor the level of the cement slurry that is introduced into the isolated zone. In this manner, in some embodiments of the invention, the upper packer 26 includes a sensor 32, and the lower packer 30 includes a sensor 34. The sensors 32 and 34, in turn, are used to detect the presence and amount of the cement slurry present in the zone. Detection of the level of the cement slurry is made possible by the tagging agents that are present in the cement slurry.

As a more specific example, in some embodiments of the invention, salt may be introduced as the tagging agent in the cement slurry. This salt, in turn, affects the resistivity of the cement slurry, as salt generally significantly increases the electrical conductivity of the cement slurry. Thus, for this example, each sensor 32, 34 may be part of a downhole resistivity measurement system that performs a resistivity measurement. The presence of the salt-tagged cement slurry decreases the measured resistance as more cement slurry is introduced into the zone.

In some embodiments of the invention, the resistivity sensors may contact the casing string 12. As a more specific example, in some embodiments of the invention, the sensor 34 may be a current transmitter, and the sensor 32 may be a current receiver. An indication of the resistance (and thus, the level of the cement slurry) may be ascertained from knowledge of the current that is transmitted by the sensor 34 and the current that is received by the sensor 32. Therefore, as the level of the cement slurry increases, the resistance that is measured via the sensors 32 and 34 decreases so that an indication of the level of the cement slurry may be obtained.

Depending on the particular embodiment of the invention, various telemetry techniques may be used to communicate indications of measured parameters from the sensors 32 and 34 to the surface of the well. For example, in some embodiments of the invention, the sensors 32 and 34 may communicate through the string 24 or through wires to a telemetry circuit 41 that is located at the surface of the well. This telemetry circuit 41 may provide a variety of different functions. For example, in some embodiments of the invention, the telemetry circuit 41 may provide a visual indication to an operator at the surface of the well, indicating when the appropriate level of slurry has been introduced into the zone. Thus, the operator may manually operate a valve 40 to control the introduction of the slurry into the well in response to the visual indication that is provided by the telemetry circuit 41. In some embodiments of the invention, the telemetry circuit 41 may directly control the valve 40, thereby controlling when the flow of the cement slurry downhole into the well ceases.

Other tagging agents and corresponding sensors may be used in other embodiments of the invention. For example, in some embodiments of the invention, the tagging agent may include radioactive particulates, and the sensors 32 and 34 may be gamma ray detectors. In this manner, the sensors 32 and 34 may detect the level of the fluid by detecting the presence of radioactive particulates. As discussed above, the sensors 32 and 34 may also communicate via various telemetry techniques with the telemetry circuit 41.

As yet another example, the tagging agent that is introduced into the cement slurry may include magnetically-detectable particulates, such as ferromagnetic particulates. In this manner, in these embodiments of the invention, these ferromagnetic particulates may be introduced into the cement slurry, and the sensors 32 and 34 may each be an electromagnetic coil. The presence of the ferromagnetic particulates in the cement slurry affects the electrical permeativity of the coil, thereby providing an indication of the level of the slurry inside the zone. As discussed above, the sensors 32 and 34 may communicate with the telemetry circuit 41 via one of several different various telemetry techniques.

Among the other features depicted in FIG. 2, a cement slurry reservoir 44 may store the cement slurry that contains the tagging agent. When the valve 40 is open, a pump 42 may pump the cement slurry with the tagging agent from the reservoir 44 through the valve 40 and into the central passageway of the string 24.

Figure 3:
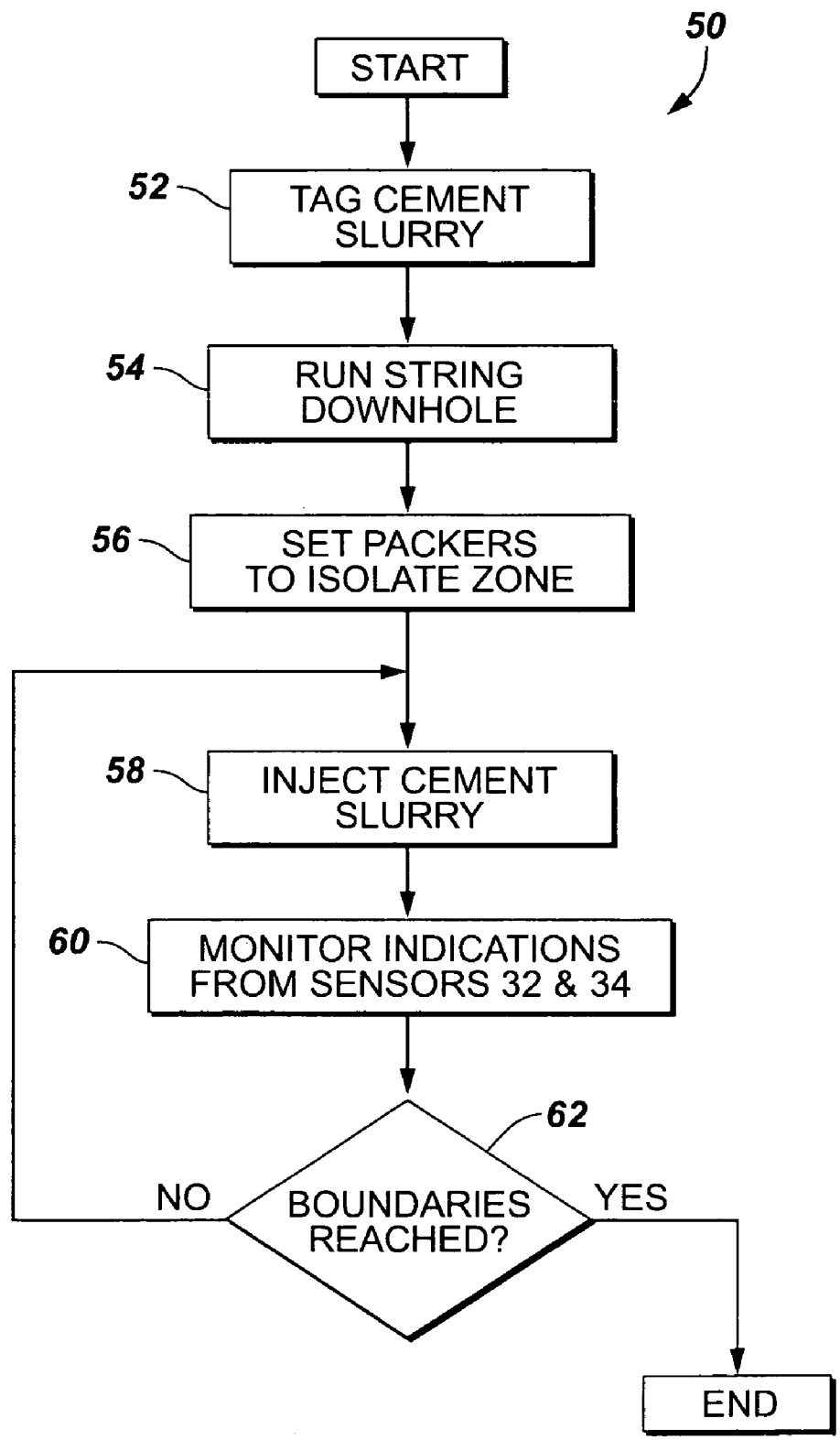
FIGS. 3 and 5 are flow diagrams depicting techniques to communicate a cement slurry into a well in a squeeze operation according to different embodiments of the invention.

Thus, to summarize, cement slurry may be introduced into a particular production zone in a cement squeeze operation pursuant to a technique 50 that is depicted in FIG. 3. In this technique 50, the cement slurry is tagged (block 52). The string containing temporary packers is then run downhole, as depicted in block 54. Subsequently, the packers of this string are set (block 56) to create the isolated zone. The cement slurry is then introduced (block 58) into the zone and indications from the sensors 32 and 34 are monitored (block 60) until the sensors indicate that an appropriate volume of the slurry has been introduced, as depicted in diamond 62. Until this volume is reached, the introduction of the cement slurry into the zone continues, as indicated in blocks 58 and 60. When the appropriate boundaries are reached, the communication of the cement slurry downhole ceases.

Figure 4:
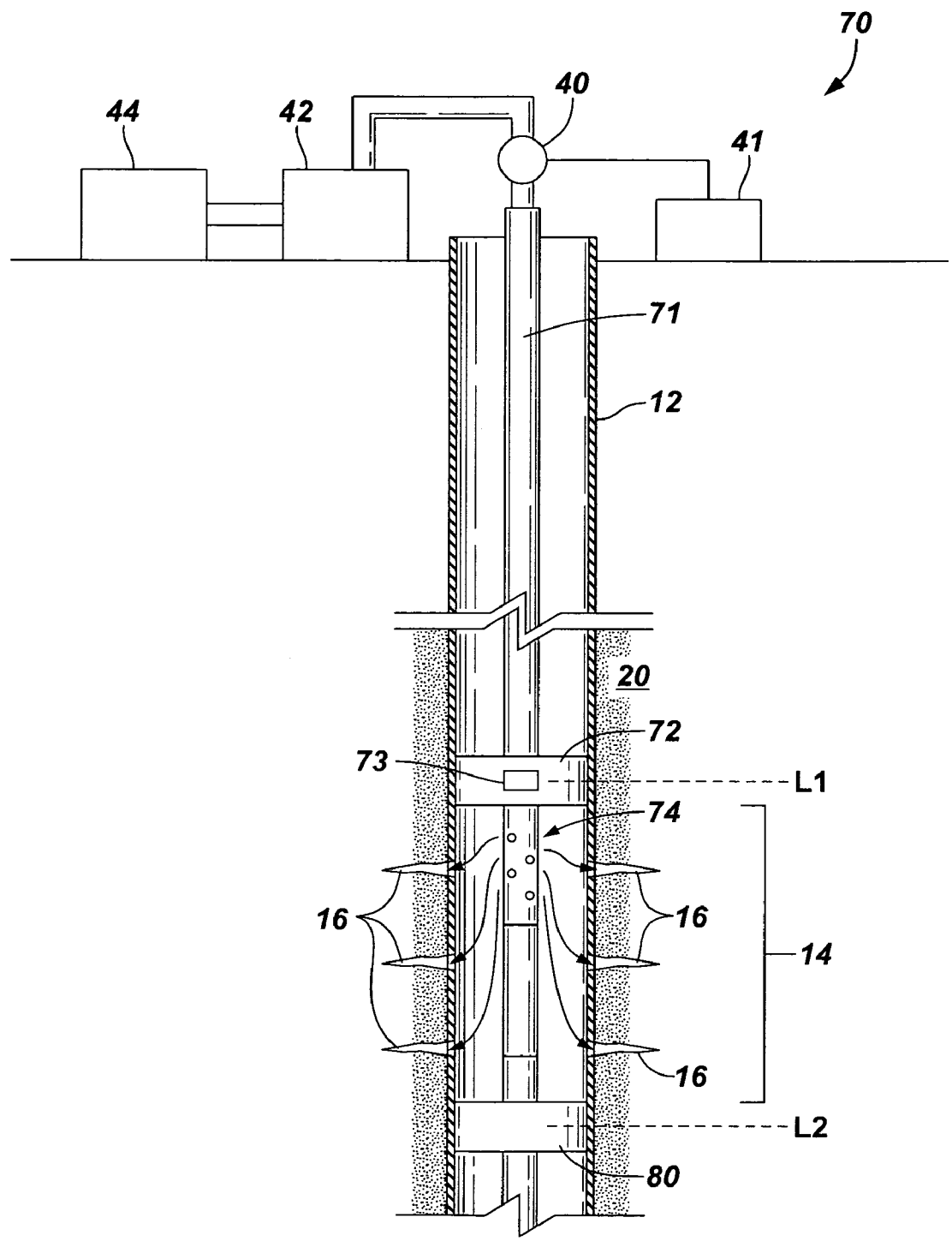

FIG. 2 depicts only one particular embodiment for a cement squeeze operation. Many other variations may be used. As an example, FIG. 4 depicts a system 70 in which the string 71 may be used in place of the string 24 (FIG. 2) in a cement squeeze operation. Unlike the string 24, the string 71 includes a single packer 72 that defines the upper boundary of the zone to be cemented. The packer 72 includes a sensor 73, that may is used to detect the presence of the cement slurry, similar to the sensor 32 of FIG. 2. The sensor 73 may be a gamma ray detector, a resistivity sensor or an electromagnetic coil (as examples), depending on the particular tagging agent that is contained in the cement slurry. The string 71 also includes radial ports 74 that are used to introduce the cement slurry into the isolated zone. However, unlike the string 24, the string 71 only includes the single packer 72. The bottom of the zone, in turn, is sealed off by a bridge plug 80.

Thus, effectively, the system depicted in FIG. 2 establishes the same isolated zone as the system depicted in FIG. 4, using a different technique. This technique is illustrated in more detail in FIG. 5.

Figure 5:
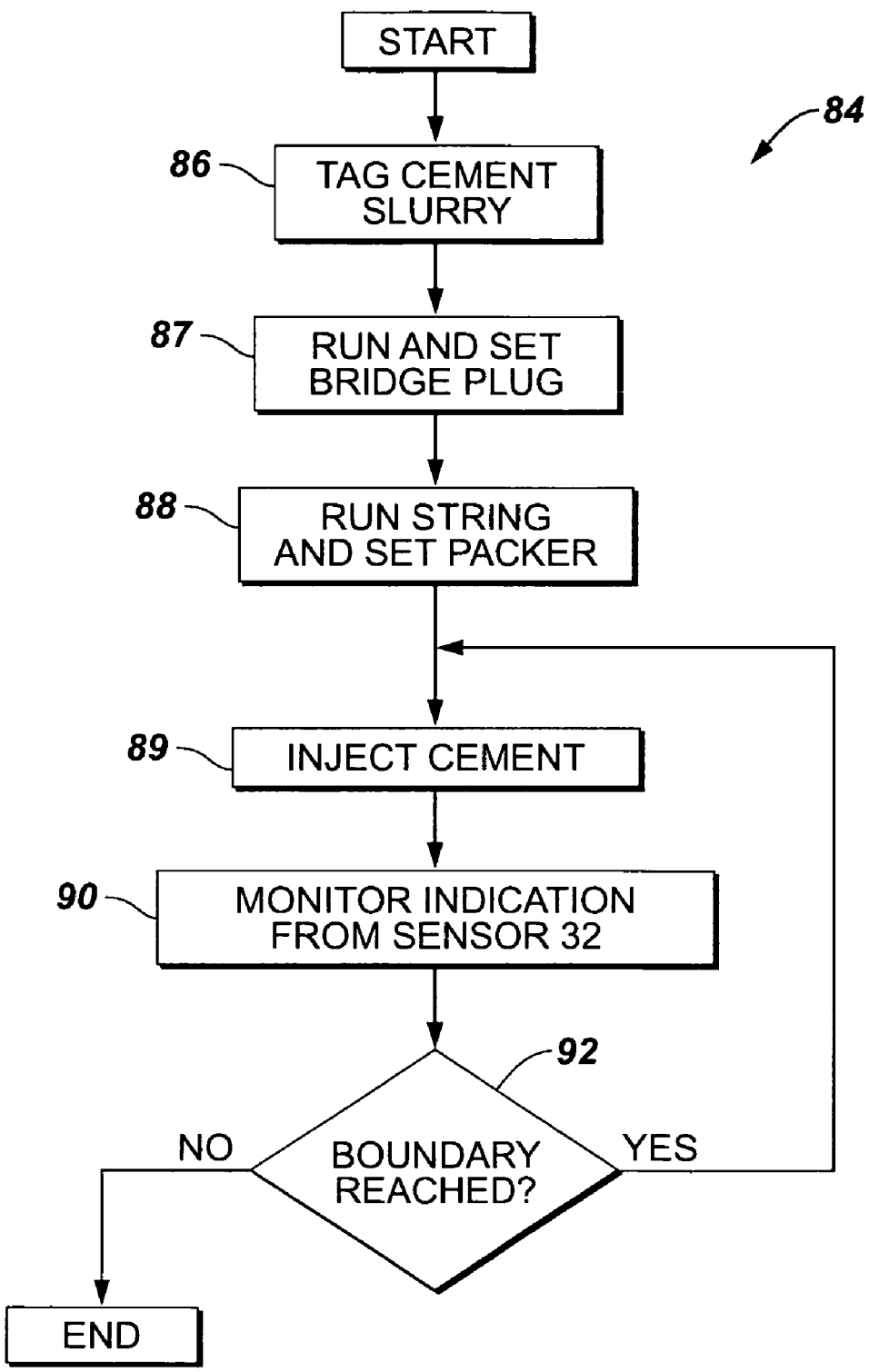

Referring to FIG. 5, the technique 84 includes tagging (block 86) the cement slurry. The bridge plug 80 is run and set, as depicted in block 87. Next, the string 71 is run and the packer is set, as depicted block 88 to create the isolated zone. Subsequently, the introduction of the cement slurry begins.

In this manner, the cement slurry is injected (block 89) and indications from the sensor 32 are monitored (block 90) to ascertain the level of the cement slurry in the zone. When it is determined (diamond 92) that the boundary is reached, then the cement squeeze operation ends. Otherwise, the injection and monitoring of the fluid continues as depicted in blocks 89 and 90.

Other variations are possible. For example, in some embodiments of the invention, the bridge plug 80 may not be used if the zone to be isolated is the lowermost zone. In this manner, the bridge plug 80 is effectively removed, and the cement slurry is introduced below the packer 72. It is noted that if zones below the zone that is cemented are to be subsequently used, the cement is drilled out of the zone 14 after the cement squeeze operation.

Although a cement squeeze operation has been described above, this is merely an example of the communication and monitoring of a fluid used in a well treatment operation. For example, the fluid may alternatively be an acidizing fluid, a fluid to plug off a particular zone, or another type of fluid.

Regardless of the type of well treatment fluid, a tagging agent is added to the fluid, and a downhole sensor is used to monitor the level of the fluid that is communicated into the well.

Figure 6:
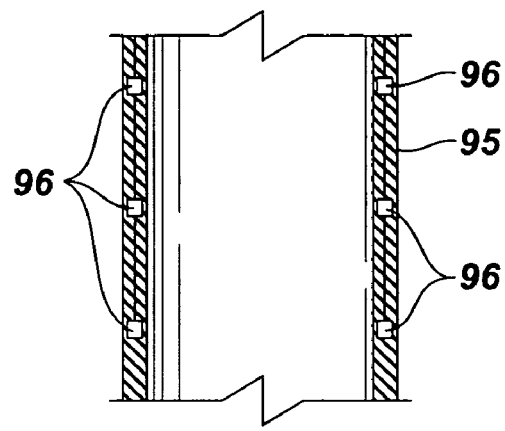
FIG. 6 is a schematic diagram of a well casing string according to an embodiment of the invention.

In other embodiments of the invention, the sensor is not located in a packer, but rather, the sensor is located in another downhole structure. For example, referring to FIG. 6, in some embodiments of the invention, a particular casing string 95 may include one or more sensors 96 to monitor the introduction of fluid in the well. For example, the sensors 96 may be installed with the casing string 95 to be used in the future for particular cementing, chemical injection or acidizing operations. Therefore, the sensors 96 may be installed with the casing string 95 for their future use in controlling whatever fluids are introduced into the well at a later time.

Figure 7:
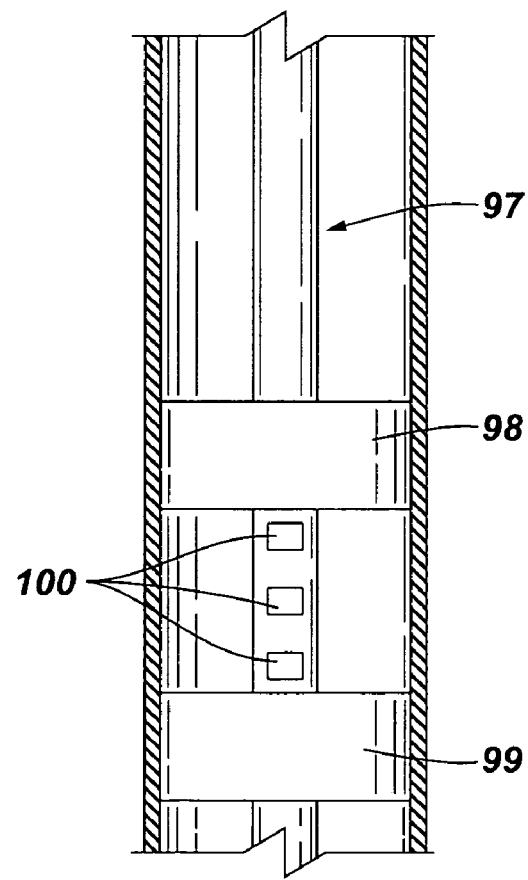
FIG. 7 is a schematic diagram of a tubular string according to an embodiment of the invention.

Referring to FIG. 7, in another embodiment of the invention, the sensors to monitor fluid introduction may be located in other tools or downhole structures. For example, FIG. 7 depicts a tubular string 97 in which sensors 100 are located in the wall of string 100. In this particular example, the sensors 100 are located between an upper 98 and a lower 99 packer that may be used to, for example, create an isolation zone between these packers 98 and 99. Other arrangements and variations are possible.

The downhole sensors may make measurements with or without piercing the casing string. In this manner, it may be desirable in some embodiments of the invention to pierce the casing string to increase the accuracy of the measurements. Both types of sensors are described in more detail below.

Referring to FIG. 19, in some embodiments of the invention, a sensor assembly 710 may be used to perform measurements outside of a well casing 702 to detect tagged fluid without piercing the casing 702. As an example, in some embodiments of the invention, the sensor assembly 710 may include a resistivity sensor, an electromagnetic coil, or a gamma ray detector, as examples. It is assumed below that each sensor assembly 710 performs resistivity measurements. Thus, the sensor assembly 710 may be used for purposes of detecting a fluid that has salt as a tagging agent, for example, as the presence of the salt decreases the sensed resistance. However, other types of sensor assemblies may alternatively be used.

Several sensor assemblies 710 may be used, such as assemblies 710a and 710b that are depicted in FIG. 19. Some of the assemblies 710 may be used as transmitters for purposes of performing resistivity measurements, and some may be used as receivers, as can be appreciated by those skilled in the art. For example, the assembly 710a may transmit a current to the casing 702, and the assembly 710b may receive a current from the casing 702, a received current that indicates resistivity. As an example, the assemblies 710 may be mounted on a string 704 (for example) that extends through the central passageway of the casing 702.

Each assembly 710 includes bow springs 708 that serve as electrical contacts to the casing 702 by flexing outwardly as depicted in FIG. 19 to contact the interior wall of the casing 702. These contacts, in turn, permit electronics 706 of each assembly 710 to transmit (if the assembly 710 is a transmitter) or receive (if the assembly 710 is a receiver) current to/from the contacted points of the well casing 702. It is noted that a significant amount of the current used for resistivity measurements is shunted through the electrically conductive casing 702. However, some of this current flows through the formation that surrounds the casing 702 and through fluid present in the casing's vicinity. Thus, the surrounding fluid affects the resistivity measurements significantly enough to measure the level of and detect the tagging agent-lender fluid. A system is described below for possibly improving the signal-to-noise ratio (SNR) of this measurement.

As depicted in FIG. 19, in some embodiments of the invention, each assembly 710 includes electrically insulative, elastomeric upper 712 and lower 714 wipers that isolate any fluid that surrounds the bow springs 708 (of the particular assembly 710) to prevent current from being communicated between adjacent assemblies 710 through fluid inside the casing 702.

As noted above, a significant amount of current that is used for resistivity measurements may be shunted through the electrically conductive casing 702. This shunted current, in turn, degrades the SNR of the resistivity measurements. For purposes of improving the SNR of these measurements, a system 715 that is depicted in FIG. 20 may be used. The system 715 is similar to the system 700 of FIG. 13 except that the electrically conductive steel casing 702 of the system 700 has been replaced by a casing 703. Unlike the casing 702, the casing 703 is formed from electrically conductive sections 703b (steel sections, for example) that are interleaved with electrically insulative sections 703a (composite sections, for example) of the casing 703.

Each assembly 710 is positioned in the well so that its bowsprings 708 contact one of the electrically conductive sections 703b of the casing 703. Because the contacted electrically conductive section 703b is in contact with the surrounding formation, the assembly 710 may use its contact with the electrically conductive section 703b to transmit current or receive current for purposes of conducting a resistivity measurement.

The system 715 establishes a significantly higher SNR for resistivity measurements due to the isolation of each electrically conductive section 703 by the insulative sections 703a that are located above and below the electrically conductive section 703. In this manner, the isolation of the electrically conductive section 703b (that is contacted by the bow springs 708 of a particular assembly 710) from the other electrically conductive sections 703b prevents the casing 703 from shunting a significant level of current between the transmitters and receivers. As a result, the SNR of resistivity measurements is improved.

Figure 21:
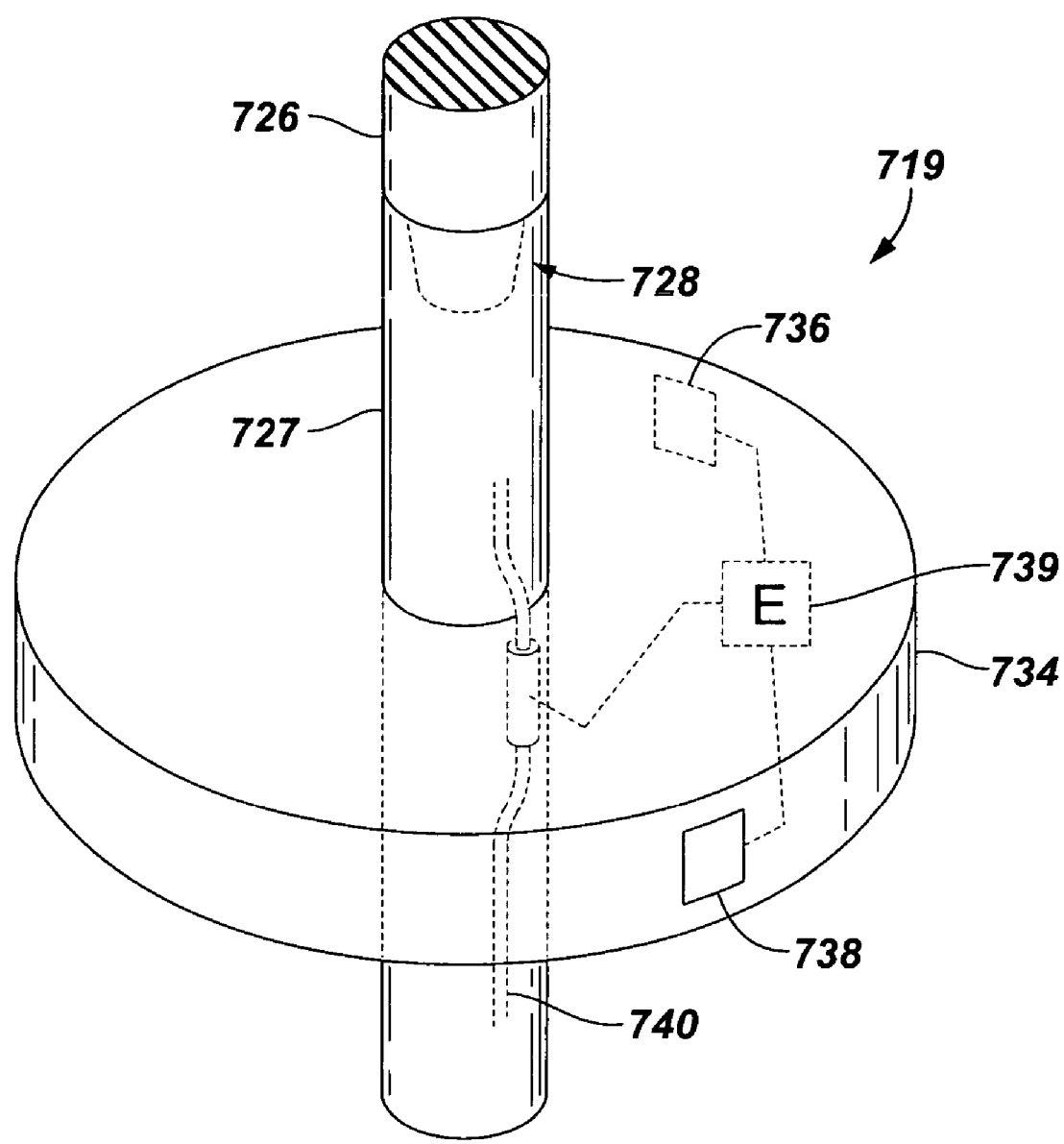
FIG. 21 is a schematic diagram of a packer according to a different embodiment of the invention.

FIG. 21 depicts a packer 719 that may be used to deploy sensors downhole in accordance with an embodiment of the invention. The packer 719 may include such sensors as a temperature gauge 738 and/or a resistivity gauge 736, as just a few examples. In this manner, these sensors may be placed on an outer surface of an elastomeric element 734 of the packer 719 so that when the element 734 expands, the sensors are pressed against the inner wall of the well casing.

Among the other features of the packer 719, the packer 719 may be part of a string 726 that includes an insulative tubing section 727 on which the packer 719 is mounted. The insulative tubing section 727 may be connected to a tubing joint 728 of the production string 728 and serve to prevent the production string 726 from shunting currents that may be transmitted or received by the sensors. The sensors are coupled to an electronics module 739 (of the packer 719) that controls the measurements that are performed by the sensors and communicates with other circuitry in the well bore or at the surface of the well via an electrical cable 740 that extends through a passageway of the production string 726.

Referring to FIG. 22, in some embodiments of the invention, sensors 809 may be connected at points along an electrical cable 808 to form a network of sensors. This network may be deployed downhole inside a central passageway of a string 804, such as a coiled tubing, for example. The electrical connections between the sensors 809 and cable 808 are sealed to isolate the fluid inside the central passageway from these electrical connections.

Referring to FIG. 23, as yet another example of a possible embodiment of the invention, a system 820 includes pocket sensors 826 that are attached to the exterior surface of a string 824 that extends downhole inside a central passageway of a casing 822. Other variations are possible.

Figure 24:
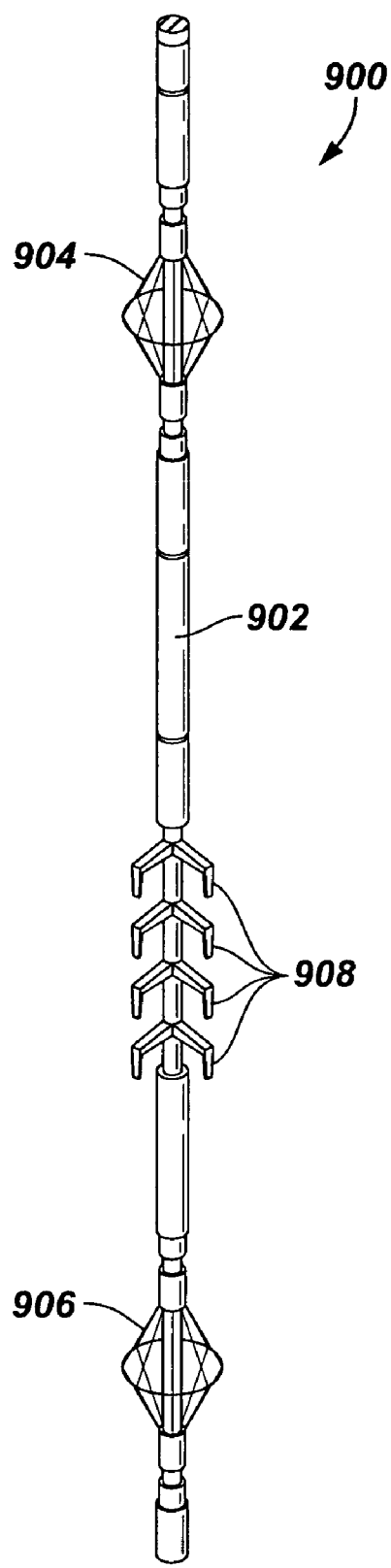
FIG. 24 is a schematic diagram of a resistivity tool according to an embodiment of the invention.

As a more specific example of a downhole resistivity tool, FIG. 24 depicts an embodiment 900 of a resistivity tool. This tool may be located between isolation packers, for example. The tool 900 includes an electronics module 902, a current injection electrode 904 that serves as a centralizer for the tool 900, four sets 908 of voltage electrodes and a current return electrode 906 that serves as a centralizer for the tool 900.

Figure 25:
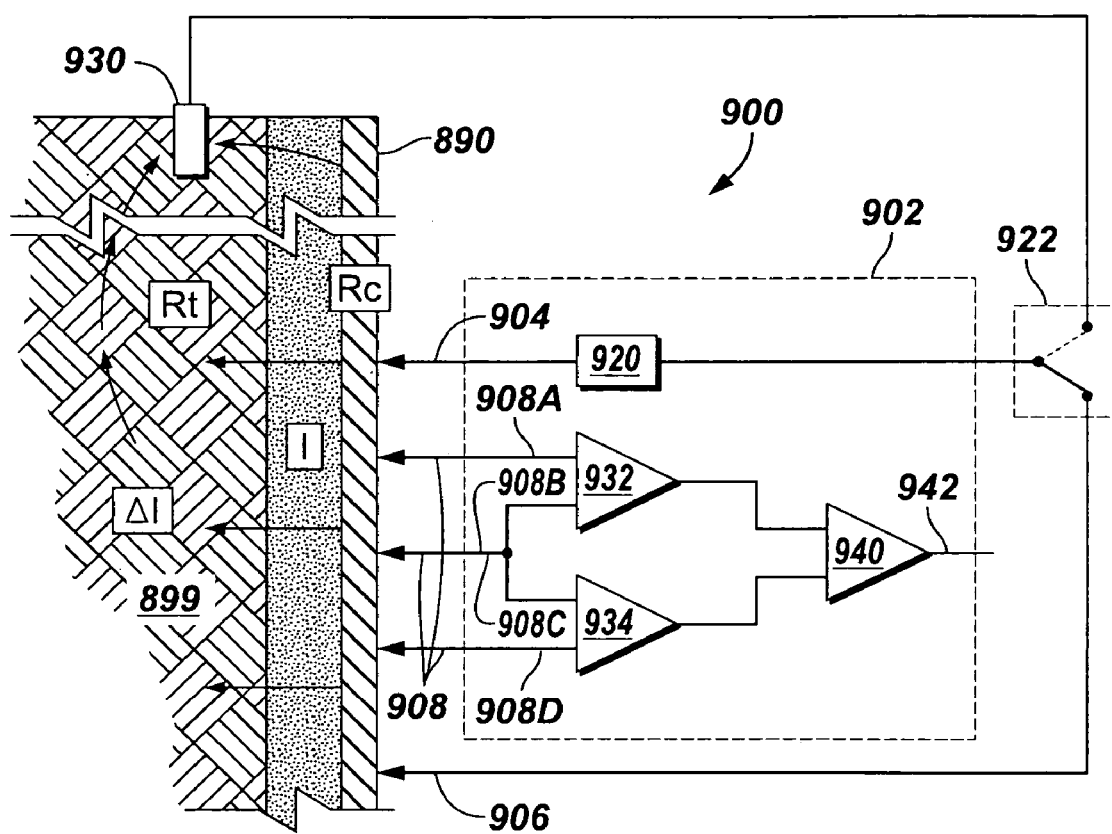
FIG. 25 is a schematic diagram of an electronics module of the resistivity tool of FIG. 24 according to an embodiment of the invention.

Referring to FIG. 25, in some embodiments of the invention, the sets 908 of voltage electrodes (electrodes 908*a*, 908*b*, 908*c* and 908*d*, as examples) may be used to measure two differential voltages called V1 and V2. The electrode sets 908 are regularly spaced along the longitudinal axis of the tool 900, and each electrode set 908 may be formed from multiple pads that are connected together in parallel for redundancy. When the tool 900 is installed inside a well casing 890, the sets 908 of electrodes establish physical contact with the interior surface of the well casing 890 and establish electrical connections with the well casing 890 at the physical contact points. The electrodes 904 and 906 also contact the interior of the well casing 890.

In some embodiments of the invention, to perform a resistivity measurement, the current source 920 is coupled via the current injection electrode 904 to deliver current to the well casing 890. A switch 922 of the electronics module 902 is set to a position to couple the current source 920 to receive the return current from the current return electrode 906. In response to this current injection, some of the current flows between the electrodes 904 and 906. However, some of the current flows into a formation 899 that surrounds the well casing 890, giving rise to a leakage current (called ΔI).

The V1 voltage is measured between across the electrode sets 908*a* and 908*b*, and the V2 voltage is measured between the electrode sets 908*c* and 908*d*. As shown in FIG. 25, in some embodiments of the invention, the electrode sets 908*b* and 908*c* may be electrically connected together. To measure the V1 and V2 voltages, the electronics module 902 may include amplifiers 932 and 934, respectively. In this manner, the input terminals of the amplifier 932 receive the V1 voltage, and the input terminals of the amplifier 934 receive the V2 voltage. The voltage difference between the V1 and V2 voltages is indicated by an amplifier 940 (of the electronics module 902) that has input terminals that are coupled to the output terminals of the amplifiers 932 and 934. More particularly, the output terminal 942 of the amplifier 940 indicates the resistivity (Rt), as defined as follows:

$$Rt = K^* Vo / \Delta I, \quad \text{Equation (1)}$$

where K is a constant, "Vo" is the voltage at the electrode sets 908*b* and 908*c* and ΔI, the leakage current, is defined as follows:

$$\Delta I = (V1 - V2)/Rc \quad \text{Equation (2)}$$

"Rc" is the casing resistance and may be measured by operating the switch 922 to connect the current source 920 to a surface electrode 930 (located at the surface of the well) instead of to the current return electrode 906 during a calibration mode of the tool 900. In this manner, during the calibration mode, the output terminal of the amplifier 940 indicates the Rc resistance at its output terminal 942.

In some embodiments of the invention, the packer may include a sensor that is disposed inside the tubing that extends through the packer for purposes of measuring fluids inside the tubing. For example, one or more sensors may be mounted inside the packer to measure a leakage current in this tubing, and the measured leakage current may be used as an indicator of the fluids inside the tubing.

Figure 8:
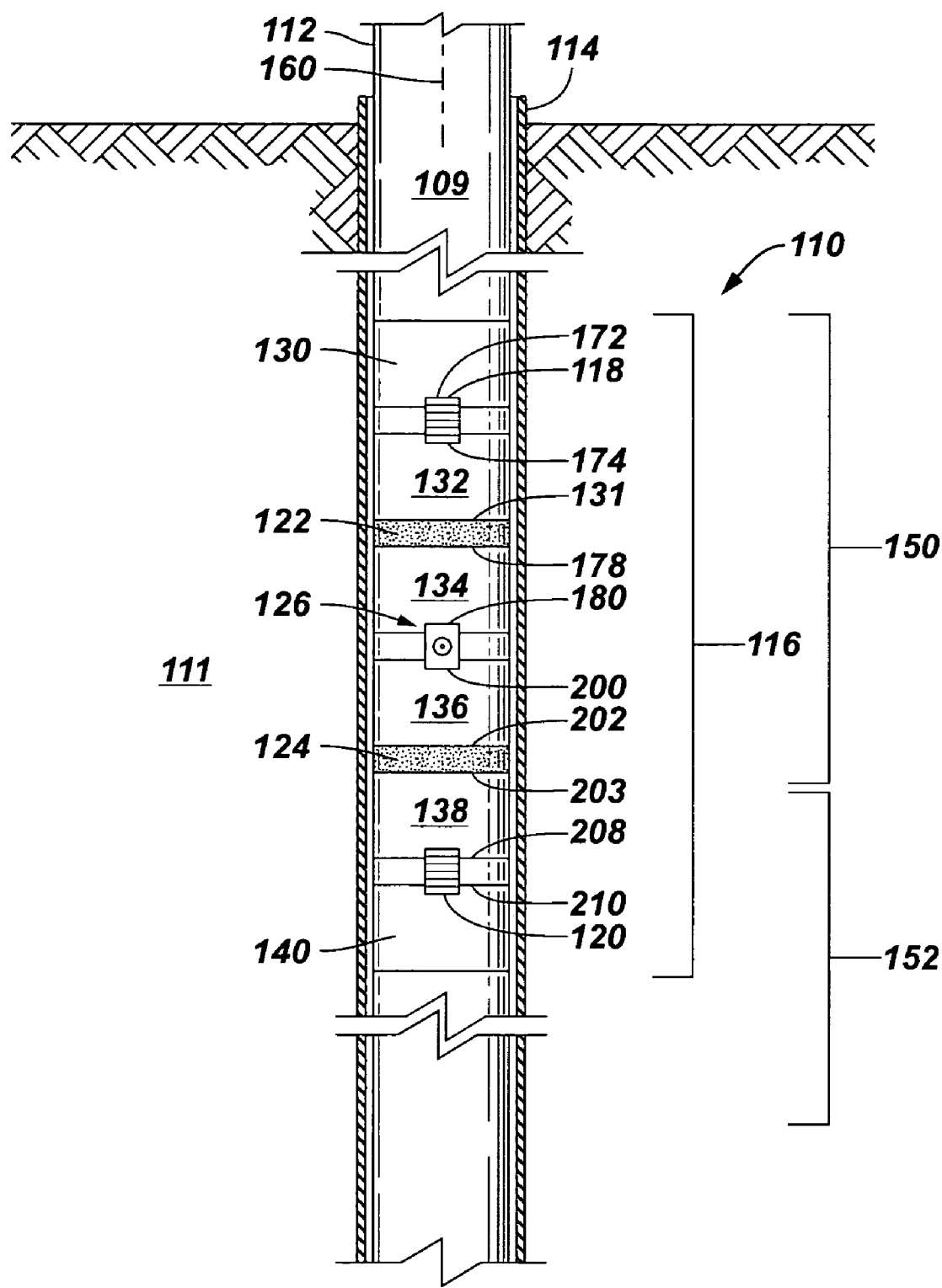

Turning now to a more specific example of a sensor assembly 104 that penetrates a well casing for purposes of performing a measurement, FIG. 8 depicts an embodiment 116 of a packer that includes at least one punch assembly 126 that may be used to pierce a casing 114 of a subterranean well 110 for purposes of establishing communication with a selected region 111 outside of the casing 114. For example, this region 111 may include a formation that surrounds the casing 114, including possibly cement that secures the casing 114 to a well bore of the well 110. By establishing communication with the region 111, one or more sensors (not shown in FIG. 8) of the packer 116 may perform measurements that are associated with the region 111. For example, sensor(s) of the packer 116 may be used to perform resistivity, gamma ray and magnetic measurements (as just a few examples), depending on the type of sensor(s) that are located in the packer 116.

When deployed downhole, the packer 116 is part of a string 112 that extends from the surface of the well 110 and is used for purposes of communicating well fluid to the surface of the well. Besides the punch assembly 126 and its associated sensor(s), the packer 116 includes upper 122 and lower 124 annular sealing elements that are respectively located above and below the punch assembly 126. When the packer 116 is set, the punch assembly 126 pierces the well casing 114, and sleeves (described below) of the packer 116 compress the upper 122 and lower 124 sealing elements to form an annulus above the packer 116 as well as seal off the hole formed by the punch assembly 126 from an interior central passageway 109 of the well casing 114.

In some embodiments of the invention, the packer 116 includes a sensor to measure the penetration force that is required to pierce the casing and the rate at which the piercing occurs. In this manner, these parameters may be analyzed to understand the strength of the formation.

There are many ways to set the packer 116. Turning now to more specific details of one possible embodiment of the packer 116, when the packer 116 is set, upper 132 and lower 134 sleeves compress the upper sealing element 122 (that resides in between the sleeves 132 and 134), and upper 136 and lower 138 sleeves compress the lower sealing element 124 (that resides in between the sleeves 136 and 138). Also when the packer 116 is set, upper 118 and lower 120 dogs, or slips, extend radially to grip the interior wall of the well casing 114 to secure the packer 116 to the casing 114. The upper slips 118 (one being depicted in FIG. 8) may be regularly spaced around a longitudinal axis 160 of the packer 116 and located below the upper sealing element 122. The lower slips 120 (one being depicted in FIG. 8) may be regularly spaced around the longitudinal axis 160 of the packer 116 and located above the lower sealing element 124.

To obtain the force that is necessary to set the packer 116 (i.e., the force needed to compress the sealing elements 122 and 124; radially extend the upper 118 and lower 120 slips; and radially extend the punch assembly 126 to pierce the well casing 114), one of several techniques may be used. For example, the weight of the string 112 and possibly the weight of associated weight collars on the string 112 may be used to derive a force that is sufficient to set the packer 116. Alternatively, the central passageway 109 of the string 112 may be filled with fluid and pressurized to derive the force needed to set the packer 116. Yet another technique to set the packer 116 involves pressurizing fluid in the annular region between the exterior surface of the string 112 and the interior wall of the well casing 114. The latter technique is described herein, although it is understood that other techniques may be used to set the packer 116.

When the packer 116 is in the appropriate depth position to be set, the fluid in the annular region between the string 112 and the well casing 114 is pressurized to the point that a mechanical barrier, such as a shear pin, shears to permit a mandrel 140 to move in an upward direction and set the packer 116, as described below. The mandrel 140 may thereafter be held in the upper position by the downhole formation pressure. The mandrel 140 circumscribes the longitudinal axis 160.

As described further below, when the mandrel 140 moves in an upward direction, the mandrel 140 compresses elements (of the packer 116) that are located between an upper surface 210 of the mandrel 140 and a lower surface 172 of a stationary upper sleeve 130 of the packer 116 together. This compression, in turn, causes the upper 118 and lower 120 slips to engage the interior wall of the well casing 114, the sealing elements 122 and 124 to form seals against the well casing 114 and the punch assembly 126 to pierce the well casing 114, as further described below. After the punch assembly 126 pierces the well casing 114, measurements that are associated with the region 111 may then be taken.

More particularly, when the mandrel 140 moves in an upward direction to set the packer 116, the lower slips 120 are compressed between the upper surface 210 (of the mandrel 140) that is located below the slips 220 and a lower surface 208 of the sleeve 138 that is located above the slips 220. Although the sleeve 138 moves in an upward direction in response to the upward force that is exerted by the mandrel 140, the distance between the surfaces 208 and 210 decreases due to the non-movement of the upper sleeve 130 to force the slips 120 in radial outward directions to grip the interior wall of the well casing 114, as further described below.

The upward movement of the sleeve 138, in turn, causes an upper surface 203 of the sleeve 138 to exert a force against the lower sealing element 124. The lower sealing element 124, in turn, exerts force on a lower surface 202 of the sleeve 136. Although the sleeve 136 moves in an upward direction in response to this force, the distance between the upper 203 and lower 202 surfaces decreases due to the stationary upper sleeve 130 to exert a net compressive force on the lower sealing element 124 to force the lower sealing element 124 to expand radially toward the interior wall of the well casing 114.

In response to the upper travel of the mandrel 140, the sleeve 136 also moves upwardly so that an upper surface 200 of the sleeve 136 exerts an upward force against the punch assembly 126. This upward force causes the punch assembly 126 to move upwardly and exert a force on a lower surface 180 of the sleeve 134. Although the sleeve 134 moves in an upward direction in response to this force, the distance between the upper 200 and lower 180 surfaces decreases to drive the punch assembly 126 into and pierce the well casing 114, as further described below.

The upward movement of the sleeve 134, in turn, causes an upper surface 178 of the sleeve 134 to exert a force against the upper sealing element 122. In response to this force, the upper sealing element 122 exerts force on a lower surface 131 of the sleeve 132. Although the sleeve 132 moves in an upward direction in response to this force the distance between the upper 178 and lower 131 surfaces decreases to exert a net compressive force on the upper sealing element 122 to force the upper sealing element 122 to expand radially toward the interior surface of the well casing 114.

Lastly, the movement of the mandrel 140 causes an upper surface 174 of the sleeve 132 to exert upward forces against the upper slips 118, and in response to these forces, the upper slips 118 exert forces against a lower surface 172 of the sleeve 130. However, unlike the other sleeves, the sleeve 130 is stationary, thereby preventing upward movement of the sleeve 130 and causing the slips 118 to move in radially outward directions to grab the interior wall of the well casing 114, as described in more detail below.

Figure 9:
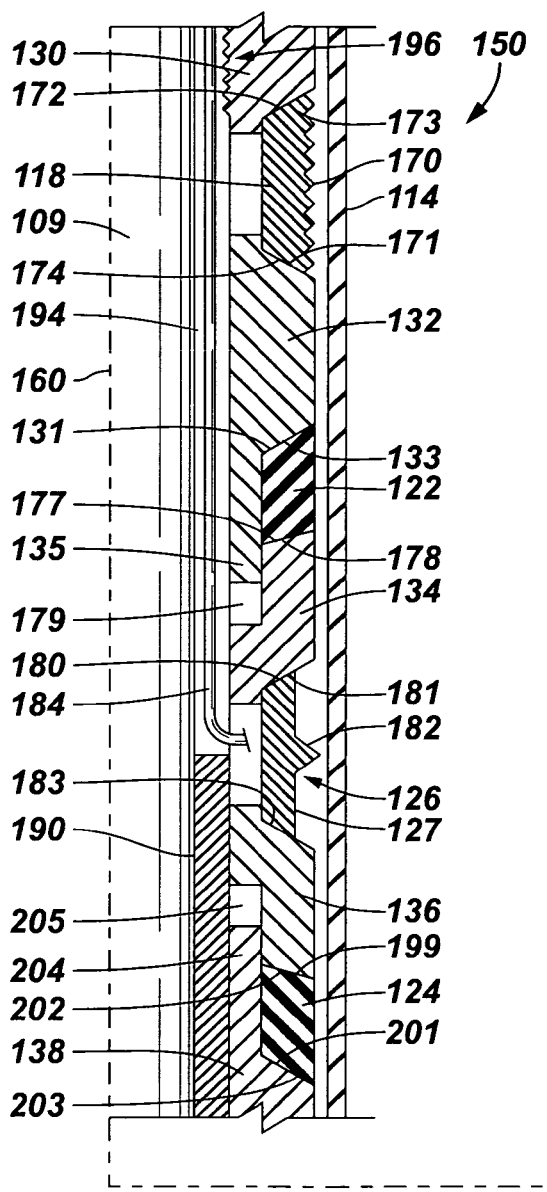
FIGS. 9 and 10 are schematic diagrams of a packer in an unset state according to an embodiment of the invention.
Figure 10:
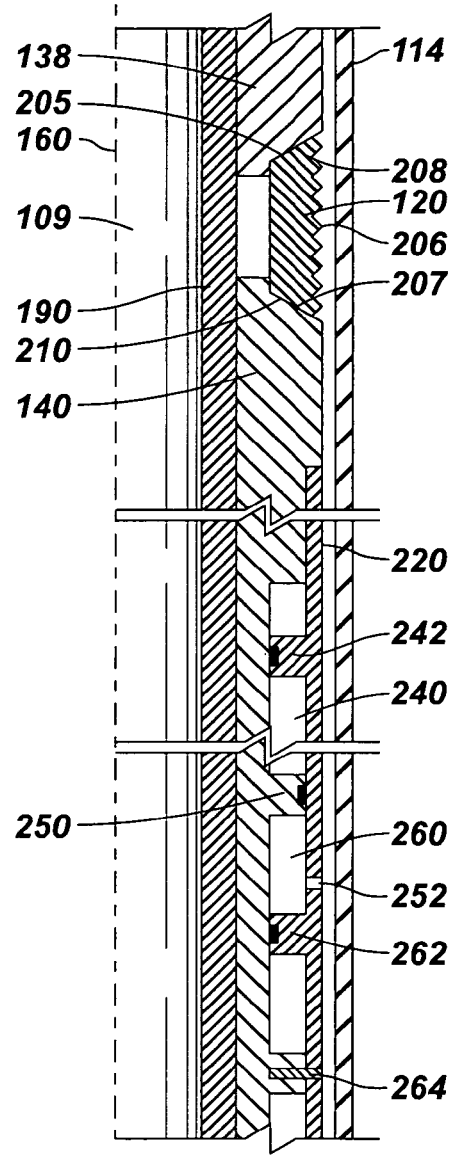
Figure 11:
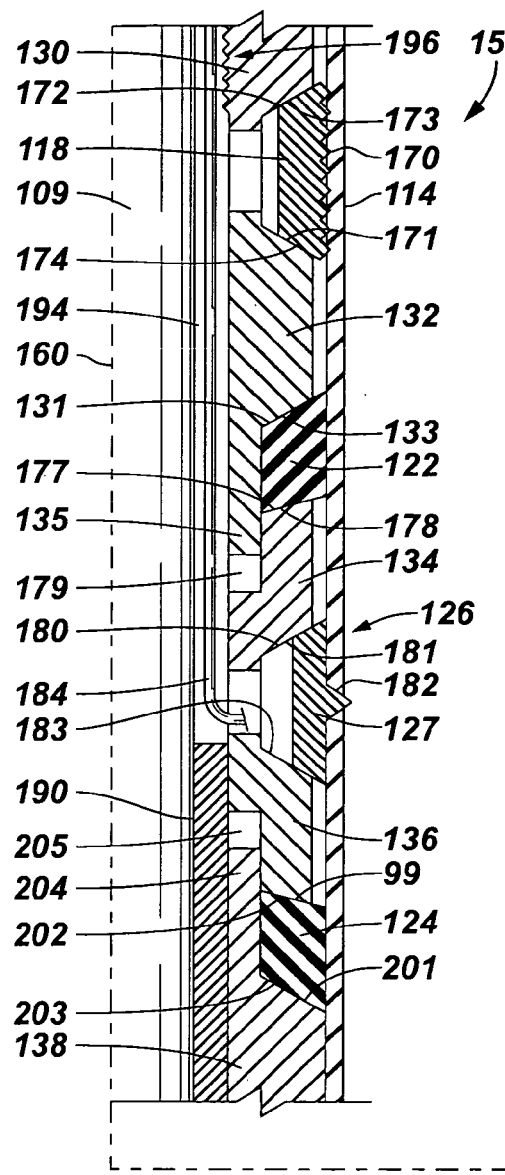
FIGS. 11 and 12 are schematic diagrams of the packer in a set state according to an embodiment of the invention.
Figure 12:
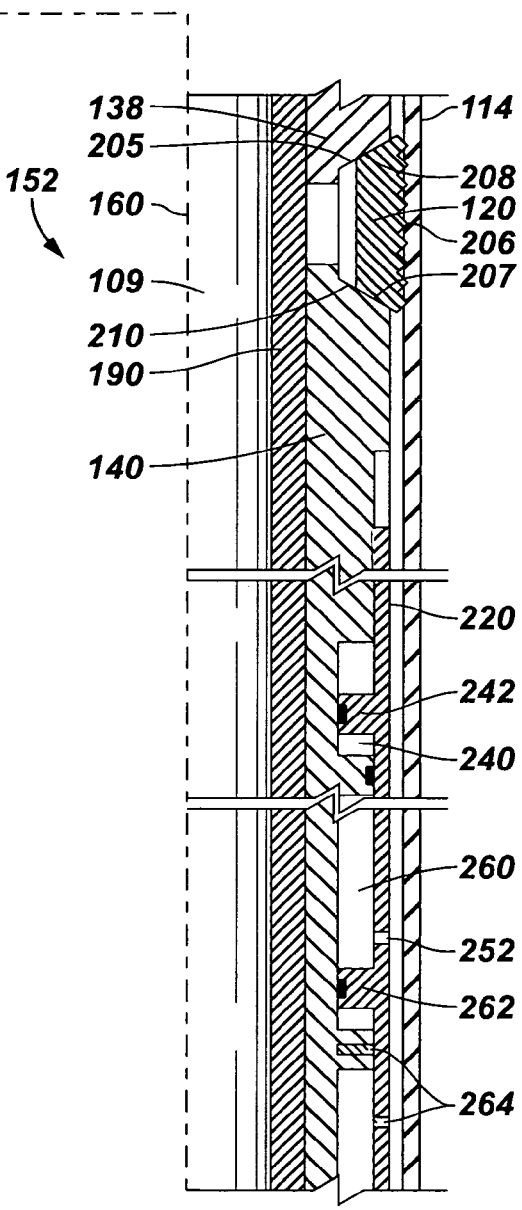

FIGS. 9 and 10 depict more detailed upper 150 (see FIG. 8) and lower 152 (see FIG. 8) sections, respectively, of the packer 116 in its unset state, according to some embodiments of the invention. FIGS. 11 and 12 are schematic diagrams of the upper 150 and lower 152 sections, respectively, of the packer 116 in its set state, according to some embodiments of the invention. In FIGS. 9, 10, 11 and 12, only one half of the cross-section of the packer 116 is depicted, with the missing cross-sectional half being derived from rotating the depicted cross-section about the longitudinal axis 160. Alternative embodiments may have an eccentricity in which the well bore is eccentric with respect to the housing of the packer 116.

Referring to FIG. 10, in some embodiments of the invention, the mandrel 140 generally circumscribes a tubular cylindrical inner housing 190 of the packer 116 and includes a piston head 250. The inner passageway of the inner housing 190 forms at least part of the central passageway 109, a passageway that remains isolated (from fluid communication) from the region that is located between the sealing elements 122 and 124 and on the exterior of the string 112. The lower surface of the piston head 250 is in communication with a chamber 260 that receives fluid via radial ports 252 (one port 252 depicted in FIG. 10) from the annular region between the string 112 and the well casing 114; and the upper surface of the piston head 250 is in communication with a chamber 240 that contains a fluid that exerts a significantly lower pressure than the pressure that is exerted by the fluid inside the chamber 260. As an example, the chamber 240 may contain fluid that exerts approximately atmospheric pressure against the upper surface of the piston head 250. The chamber 260 is formed from an annular cavity that is created between the exterior sidewall of the mandrel 240 and the interior sidewall of a cylindrical outer housing 220 (of the packer 116) that circumscribes the mandrel 140.

The lower end of the chamber 160 is sealed via an extension 262 of the outer housing 220, an extension that radially extends inwardly into the mandrel 140. One or more O-rings exist between the extension 262 and the mandrel 140 and reside in one or more annular notches of the extension 262. The upper end of the chamber 260 is sealed via the piston head 250 that includes one or more annular notches for holding one or more O-rings to form this seal. The upper end of the chamber 240 is sealed via an extension 242 of the outer housing 220, an extension that radially extends inwardly into the mandrel 140. One or more O-rings exist between the extension 242 and the mandrel 140 and reside in one or more annular notches of the extension 242. The lower end of the chamber 240 is sealed via the O-ring(s) in the piston head 250.

Although when the packer 116 is run downhole the pressure differential between the two chambers 240 and 260 exerts a net upward force on the mandrel 140, the travel of the mandrel 140 is initially confined by a shear pin 264. Therefore, when the packer 116 is to be set, the pressure of the fluid in the annular region between the string 112 and the well casing 114 is increased (via a pump at the surface of the well) to a sufficient level to cause the shear pin 264 to shear, thereby permitting the mandrel 40 to move upwardly to set the packer 116. The set position of the mandrel 140 is maintained via the downhole formation pressure.

Referring to FIG. 10, the mandrel 140 generally circumscribes the inner housing 190 and the longitudinal axis 160. The upper surface 210 of the mandrel 140 is an inclined annular surface that has a surface normal that points in an upper direction and away from the longitudinal axis 160. The upper surface 210 contacts complementary inclined lower surfaces 207 of the lower slips 120. The lower surface 208 of the sleeve 138 is an inclined annular surface and has a surface normal that points in a downward direction and away from the longitudinal axis 160. The lower surface 208 contacts complementary inclined upper surfaces of the lower slips 120. Due this arrangement, when the mandrel 140 moves in an upward direction, the lower slips 120 are pushed outwardly into the interior wall of the well casing 114 so that teeth 206 of the lower slips 120 are thrust against the well casing 114 to secure the packer 116 to the casing 114, as depicted in FIG. 12.

Referring to FIGS. 9 and 10, the sleeve 138 circumscribes the inner housing 190 and the longitudinal axis 160. The upper surface 203 of the sleeve 138 is an inclined annular surface and has a surface normal that points in an upper direction and away from the longitudinal axis 160. The upper surface 203 contacts a complementary inclined annular surface 201 of the lower sealing element 124. As shown, the sleeve 138 includes an upper annular extension 204 that is circumscribed by the lower sealing element 124 so that the element 124 is supported on its inner sidewall surface during compression of the element 124 when the packer 116 is set.

An upper surface 199 of the lower sealing element 124 abuts the lower surface 202 of the sleeve 136. The sleeve 136 circumscribes the inner housing 190 and the longitudinal axis 160. The upper surface 199 of the sealing element 124 is an inclined annular surface and has a surface normal that points in an upper direction and away from the longitudinal axis 160. The upper surface 199 contacts the complementary inclined annular lower surface 202 of the sleeve 136. As shown, the sleeve 136 includes an inner annular groove 205 that receives the upper extension 204 of the sleeve 138 and allows space for the sleeve 138 to move when the packer 116 is set. Thus, due to the upper extension 204 and the surfaces 202 and 203, when the packer 116 is set, the distance between the surfaces 202 and 203 decreases to force the sealing element 124 to expand toward the well casing 114, as depicted in FIG. 11.

Referring to FIG. 9, the upper surface 200 of the sleeve 136 is an inclined annular surface and has a surface normal that points in an upper direction and away from the longitudinal axis 160. The upper surface 200 contacts a complementary inclined surface 183 of a punch 127 of the punch assembly 126. An upper surface 181 of the punch 127 contacts the complementary inclined annular lower surface 180 of the sleeve 134. Due to this arrangement, when the packer 116 is set, the upward movement of the mandrel 140 compresses the distance between the lower surface 180 of the sleeve 134 and the upper surface 200 of the sleeve 136. As a result, the punch 127 is forced in a radially outward direction into the interior sidewall of the well casing 114 so that a point 182 of the punch 127 pierces the well casing 114, as depicted in FIG. 11.

The sleeve 134 circumscribes the inner housing 190 and the longitudinal axis 160, as depicted in FIG. 9. An annular notch 179 is formed in the sleeve 134 for receiving a lower extension 135 of the sleeve 132. The upper surface 178 of the sleeve 134 is an inclined annular surface and has a surface normal that points in an upper direction and toward the longitudinal axis 160. The upper surface 178 contacts a complementary inclined annular surface 177 of the upper sealing element 122. An upper surface 133 of the upper sealing element 122, in turn, is an inclined annular surface and has a surface normal that points in an upper direction and toward the longitudinal axis 160. The upper surface 133 contacts the complementary inclined annular lower surface 131 of the sleeve 132. Due to the lower extension 135 of the sleeve 132 and the surfaces 131 and 178, when the packer 116 is set, the distance between the surfaces 131 and 178 decreases to force the upper sealing element 122 to expand toward the interior sidewall well casing 114, as depicted in FIG. 11.

As shown in FIG. 9, the sleeve 132 circumscribes the inner housing 190 and the longitudinal axis 160. The sleeve 132 includes the upper surface 174, a surface that is an inclined annular surface and has a surface normal that points in an upper direction and away from the longitudinal axis 160. The upper surface 174 of the sleeve 132 contacts corresponding complementary inclined surfaces 171 of the upper slips 118. Upper surfaces 173 of the upper slips 118 are inclined and have surface normals that each point in an upper direction and away from the longitudinal axis 160. The upper surfaces 173 contact the complementary annular inclined lower surface 172 of the stationary sleeve 130, a sleeve that, for example, has a threaded connection 196 with the inner housing 190 to prevent the sleeve 130 from moving relative to the other sleeves. Due to this arrangement, when the sleeve 132 moves in an upward direction when the packer 116 is set, the upper slips 118 are pushed outwardly into the interior sidewall well casing 114 so that teeth 170 of the upper slips 118 are thrust against the interior sidewall of the well casing 114, as depicted in FIG. 11.

In some embodiments of the invention, the punch assembly 126 includes circuitry to measure a characteristic of the region 111 that surrounds the casing 114 near when the punch 127 pierces the well casing 114. A cable 184 may be used to communicate the measured characteristic(s) from the punch assembly 127. In this manner, in some embodiments of the invention, the cable 184 extends from the punch assembly 126 uphole and is located inside a longitudinal passageway 194 of the inner housing 190. The cable 184 may be a wire cable or may be a fiber optics cable.

As an example, the cable 184 may extend to the surface of the well and communicate an electrical signal that indicates the measured characteristic(s) after the packer 116 has been set and the punch 127 has penetrated the well casing 114. Alternatively, in other embodiments of the invention, the cable 184 may extend to a downhole telemetry interface that has a transmitter for transmitting an indication of the measured characteristic(s) uphole. As another example, the housing 190 itself may be used to communicate this indication (via acoustic telemetry, for example) or another cable may be used to communicate this indication uphole. Other uphole telemetry systems may be used. Alternatively, the packer 116 may include electronics to store an indication of the measured characteristic(s) in a semiconductor memory so that the indication may be retrieved when the packer 116 is retrieved, or the packer 116 may include a data link device, such as an inductive coupling. Other variations are possible.

Figure 13:
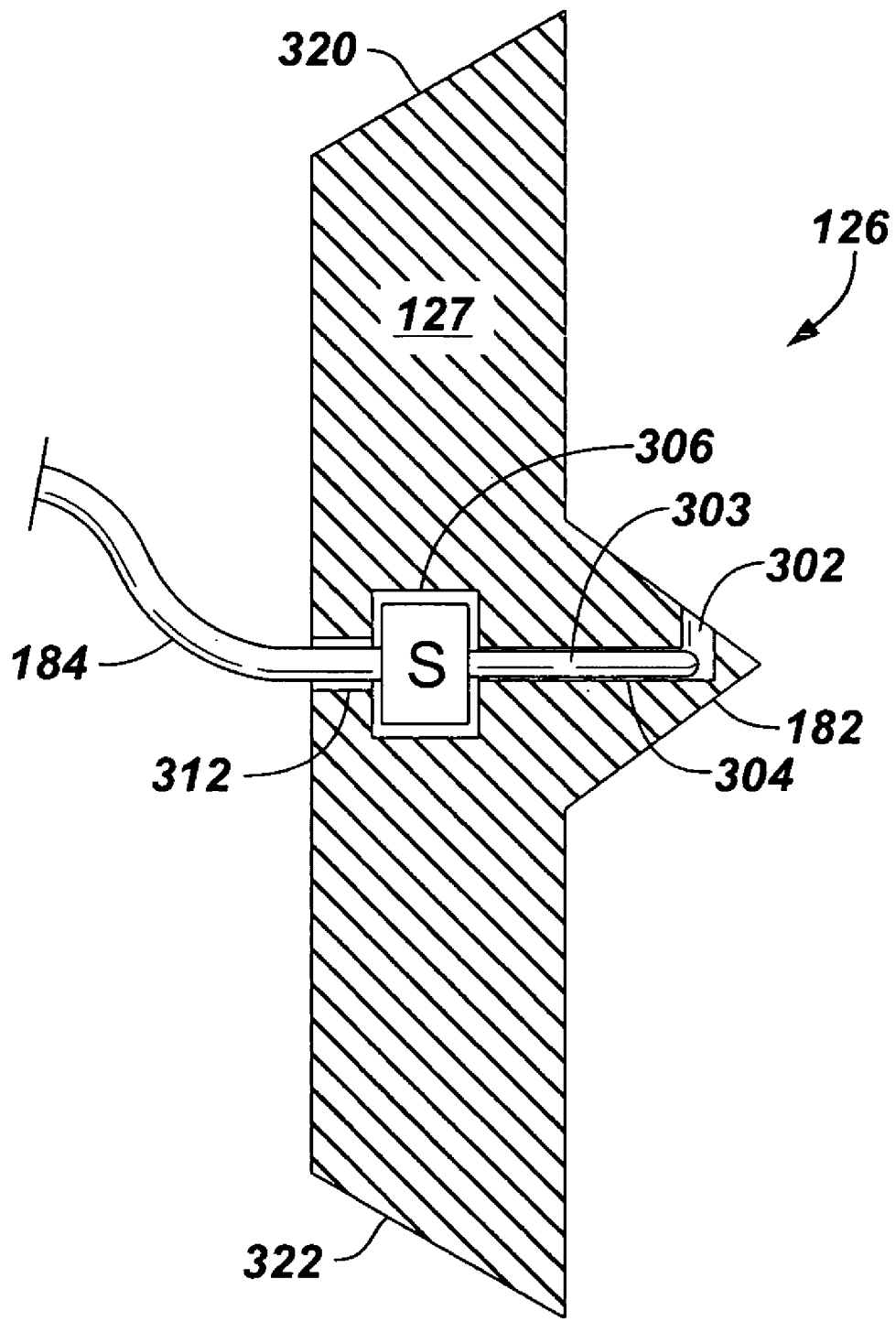
FIG. 13 is a more detailed schematic diagram of a punch assembly of the packer according to an embodiment of the invention.

Referring to FIG. 13, in some embodiments of the invention, the punch 127 may be formed from a metallic body (a metallic body made from titanium, for example) and include a conical point 182 of a sufficiently small conical angle to generate the force needed to penetrate the well casing 114. The punch 127 may also include a cavity 312 to house a sensor 306 of the punch assembly 126. As an example, the sensor 306 may be a resistivity, pressure, gravity/force, gamma ray or nuclear magnetic resonance sensor, as just a few examples. The sensor 306 may also be a strain gauge or an accelerometer. For embodiments where the sensor 306 is a resistivity sensor, the sensor 306 may be coupled to a probe 303 that extends through a passageway to an exit near the tip of the point 182. The probe 303 may be electrically isolated from the metallic body that forms the punch 127. The passageway may include, for example, a radially extending conduit 304 that extends toward the tip of the point 182 and an upwardly extending conduit 302 that emerges in the conical sidewall of the point 182 near the tip. In other embodiments of the invention, the passageway may not include the probe 303. Instead, the passageway may be used to communicate well fluid to the sensor 306. Other variations are possible. A conduit, such as the passageway 312, may also be formed in the punch 127 for purposes of routing the cable 184 from the sensor 306 to a region outside of the punch assembly 126.

In some embodiments of the invention, the sensor 306 may be a metallic probe, and thus, the probe 306 may form an electrode for measuring resistivity, for example. Thus, in these embodiments, the conduit 302 may not be needed. In other embodiments of the invention, the sensor 306 may be formed from a non-conductive material to minimize casing shorting and maximize the signal-to-noise ratio (SNR).

Other embodiments are within the scope of the following claims for the puncture-type sensor assembly. For example, multiple punch assemblies may be used to establish an array. As a more specific example, resistivity transmitters and receivers may be located in various punch assemblies that are spaced longitudinally along the well casing 114 to establish a resistivity array. Each transmitter transmits a current, and the currents received by the receivers may be used to indicate resistivity measurements for the surrounding formations. In some embodiment of the invention, the sensor(s) 306 may measure pressure(s) in one or more gas, oil or water regions of the formation.

As an example of such an array, FIG. 17 depicts a string 490 that includes multiple packers 506, each of which includes a punch assembly 500. In this manner, each packer 506 includes upper 502 and lower 506 sealing elements 502 above and below, respectively, the associated punch assembly 500. More than one punch assembly 500 may be located in one of the packers 506. FIG. 18 depicts a string 600 that forms an array from multiple punch assemblies 604 that are located and spaced apart between an upper packer 602 and a lower packer 606. Other variations are possible.

As an example of another embodiment of the invention, the sensor 306 may be located behind the punch assembly 126, an arrangement that keeps the cable 184 from moving with the punch assembly 126.

Figure 14:
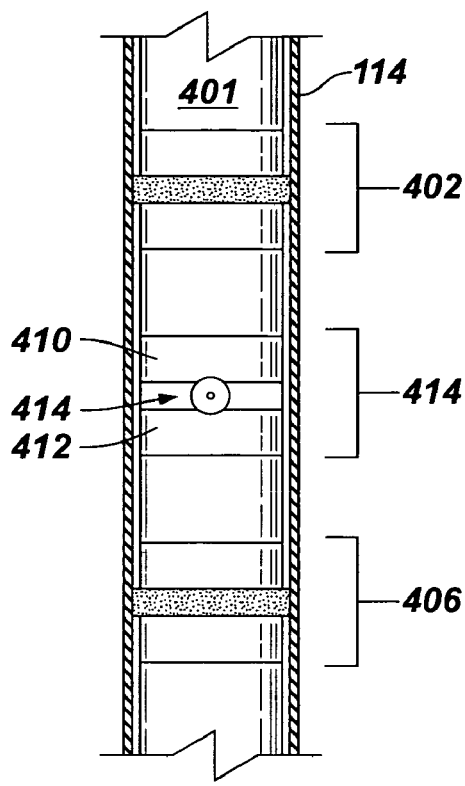

FIG. 14 depicts an embodiment of the invention that includes a string 410 with two packers 402 and 406 that form an isolated region in between for conducting measurements. In this manner, a punch assembly 414 may be located between the two packers 402 and 406 and be used to pierce the well casing 114 when sleeves 410 and 412 (for example) force the punch assembly 414 into the casing 114. Thus, as depicted in FIG. 11, the punch assembly 414 may be part of a tool that is separate from the packers 402 and 406. This tool may also include a sensor to perform a downhole measurement when the well casing 114 is pierced.

Figure 15:
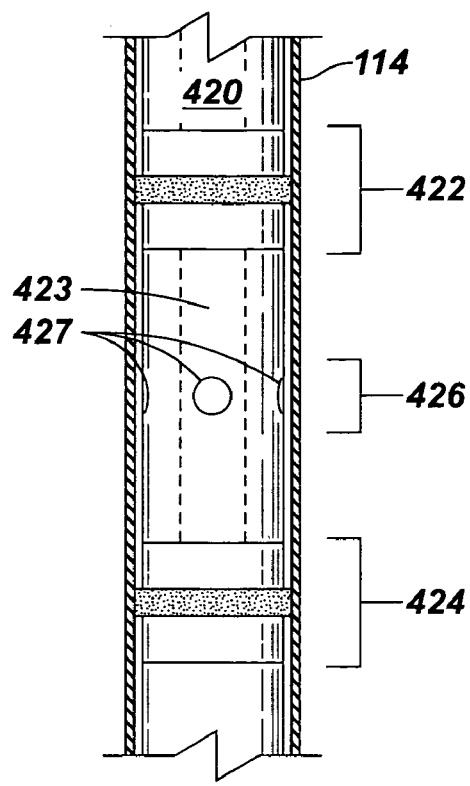

In some embodiments of the invention, the punch may be replaced by another puncture device, such as a shaped charge, for example. In this manner, referring to FIG. 15, a string 420 includes one or more shaped charges 427 that are located between packers 422 and 424 of the string 420. In this manner, the shaped charges pierce the well casing 114 to permit communication between sensors and the outside of the well casing 114. It is noted that the piercing of the well casing 114 by the shaped charges 427 does not establish fluid communication between the exterior of the well casing 114 and a central passageway 423 of the string 420. Thus, an annular sealed region between the packers 422 and 424 is created for performing measurements.

Figure 16:
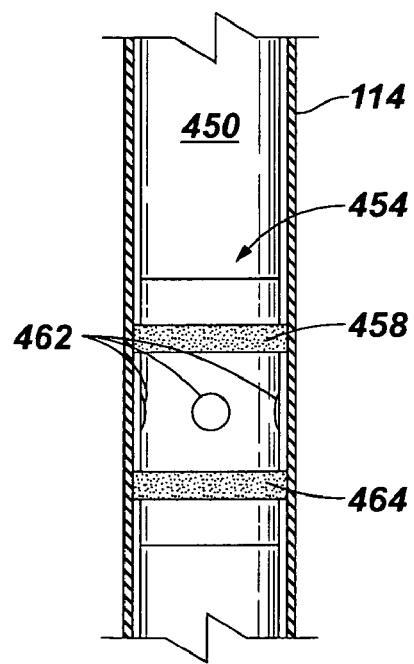

FIG. 16 depicts yet another embodiment, a string 450 that includes a packer 454 that uses one or more shaped charges 462 between its upper 458 and lower 464 sealing elements to pierce the well casing 114. Thus, the packer 454 has a similar design to the packer 116, with the punch assembly 126 of the packer 116 being replaced by one or more shaped charges 462. The packer 454 also includes a sensor to measure a property associated with the region outside of the well casing 114 where the shaped charges 462 pierce the well casing 114.

Thus, the various strings described above establish an upper seal and a lower seal with the interior wall of the well casing near a region of the well in which measurements are to be taken. The seals create a sealed annular space inside the well casing, and this annular space is in communication with the region due to the piercing of the well casing via a puncture device of the string. A sensor of the string may then take measurements due to this communication.

Figure 26:
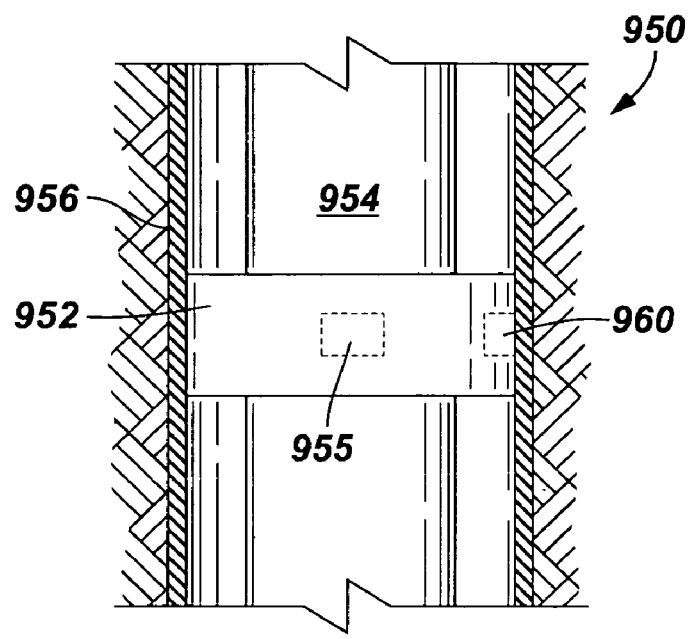
FIGS. 26 and 27 are schematic diagrams depicting a packer according to another embodiment of the invention.

Other embodiments are within the scope of the following claims. For example, referring to FIG. 26, in some embodiments of the invention, an arrangement 950 may be used as a downhole sensor. In this arrangement 950, a packer 952 includes a projectile deployment device 960 to pierce a well casing 956. In this manner, the packer 952 may be part of a string 954 that is lowered downhole inside a wellbore that is cased by the casing 956. Due to this technique, the casing 956 may be penetrated via a projectile that is fired by the projectile deployment device 960 for purposes of performing downhole measurements without requiring the punch assembly that is described above.

Figure 27:
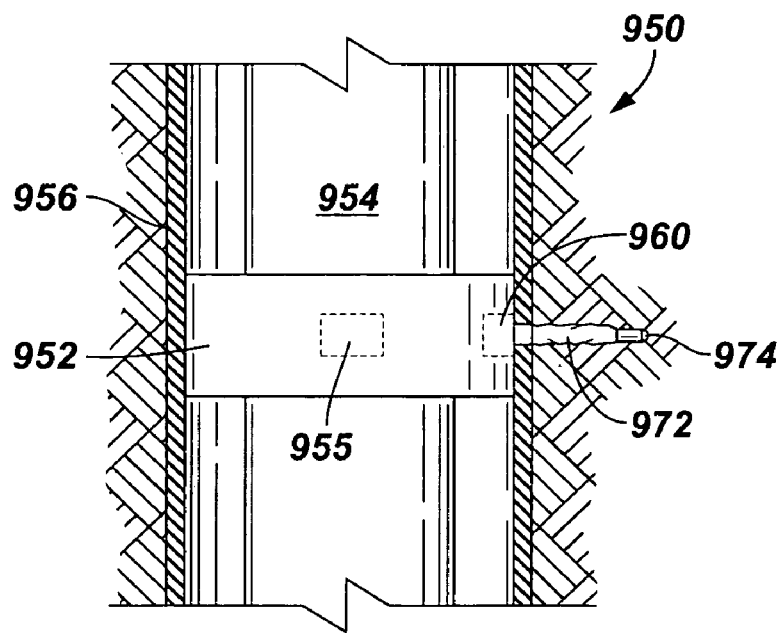

Referring also to FIG. 27, when initially deployed downhole the projectile deployment mechanism 960 includes a bullet that is oriented in a radial direction toward the casing 956. When the packer 952 is in the appropriate position downhole, a piston may be actuated by a variety of techniques to cause firing of the bullet. The firing of the bullet, in turn, produces a projectile 974 that forms a perforation 972 in the casing 956 and extends into the surrounding formation, as depicted in FIG. 27. Depending on the particular embodiment of the invention, the projectile 974 is in communication with a receiver 955 via either a wireless link or a wired tethered link. However, regardless of the physical and electrical connections between the projectile 974 and the receiver 955, the projectile 974 includes a sensor (such as one of the many sensors described herein, for example) that communicates formation characteristics back to the receiver 955. A variety of telemetry techniques may be used to establish communication between the receiver 955 and uphole electronics. Other variations are possible.

The projectile 974 and sensor may initially be part of a shell, as further described in U.S. Pat. No. 6,234,257, entitled, "DEPLOYABLE SENSOR APPARATUS AND METHOD," granted on May 22, 2001.

In the foregoing description, directional and orientation-related terms such as upper, lower, etc. were used to describe the strings and their associated features. However, such directions and orientations are not needed to practice the invention, as the scope of the invention is defined by the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A system usable with a well, comprising:
   a casing string creating a region located outside of the casing string between the casing string and a wellbore wall;
   a second string to establish an isolated zone inside the casing string and communicate a fluid flow into the region such that the fluid flows from the string, into the isolated zone and then into the region; and
   a sensor being part of the second string and being located inside the casing string to indicate a level of the fluid in the region.

2. The system of claim 1, wherein the sensor is part of a downhole tool adapted to perform a function not related to indicating the level of the fluid in the region.

3. The system of claim 2, wherein the downhole tool comprises a packer.

4. The system of claim 1, wherein the sensor is adapted to indicate presence of a tagging agent in the fluid.

5. The system of claim 4, wherein the tagging agent comprises at least one of the following:
   ferromagnetic particulates, salt and radioactive particulates.

6. The system of claim 1, wherein the sensor comprises at least one of the following:
   a gamma ray detector, a coil and a resistivity sensor.

7. The system of claim 1, wherein the sensor is part of a downhole tool coupled to a string extending into the well.

8. The system of claim 1, further comprising:
   a bridge plug to form a boundary of the isolated zone.

9. The system of claim 3, wherein the packer and a bridge plug form the isolated zone.

10. The system of claim 3, wherein the packer and another packer of the second string form the isolated zone.

11. The system of claim 1, wherein the fluid comprises a cement slurry, the system further comprising a pump at the surface to deliver the cement slurry downhole such that the delivery of the cement slurry is controlled in response to a level of the cement slurry indicated by the sensor.

12. The system of claim 11, wherein the cement slurry comprises a tagging agent and the sensor is adapted to detect the tagging agent to indicate the level of the cement slurry.

13. The system of claim 12, wherein the tagging agent comprises at least one of the following:
   ferromagnetic particulates, salt and radioactive particulates.

14. The system of claim 11, wherein the region bridges gravel packed intervals of the well.

* * * * *